(12) United States Patent
Goel et al.

(10) Patent No.: US 10,096,147 B2
(45) Date of Patent: Oct. 9, 2018

(54) VISIBILITY INFORMATION MODIFICATION

(71) Applicant: QUALCOMM Incorporated, San Diego, CA (US)

(72) Inventors: Vineet Goel, San Diego, CA (US); Ruijin Wu, San Diego, CA (US); Young In Yeo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/066,584

(22) Filed: Mar. 10, 2016

(65) Prior Publication Data

US 2017/0263039 A1 Sep. 14, 2017

(51) Int. Cl.
*G06T 15/00* (2011.01)
*G06T 15/20* (2011.01)
*G06T 19/20* (2011.01)

(52) U.S. Cl.
CPC ............ *G06T 15/005* (2013.01); *G06T 15/00* (2013.01); *G06T 15/20* (2013.01); *G06T 15/205* (2013.01); *G06T 19/20* (2013.01); *G06T 2200/04* (2013.01)

(58) Field of Classification Search
CPC ..... G06T 15/005; G06T 15/205; G06T 19/20; G06T 2200/04
See application file for complete search history.

(56) References Cited

U.S. PATENT DOCUMENTS

| 6,476,807 B1 | 11/2002 | Duluk, Jr. et al. |
| 2005/0093873 A1 | 5/2005 | Paltashev et al. |
| 2005/0195198 A1 | 9/2005 | Anderson et al. |
| 2013/0241938 A1 | 9/2013 | Gruber et al. |
| 2015/0187117 A1 | 7/2015 | Balci et al. |

FOREIGN PATENT DOCUMENTS

| EP | 1901234 A2 | 3/2008 |
| WO | 0137220 A1 | 5/2001 |

OTHER PUBLICATIONS

Hsiao et al., "A Hierarchical Triangle-Level Culling Technique for Tile-based Rendering," 2012 Fifth International Symposium on Parallel Architectures, Algorithms and Programming (PAAP), IEEE, Dec. 17, 2012, pp. 119-125.
International Search Report and Written Opinion from International Application No. PCT/US2017/012142, dated Mar. 22, 2017, 15 pp.
International Preliminary Report on Patentability from International Application No. PCT/US2017/012142, dated Feb. 20, 2018, 25 pp.

*Primary Examiner* — Sing-Wai Wu
(74) *Attorney, Agent, or Firm* — Shumaker & Sieffert, P.A.

(57) ABSTRACT

In an example, a method for rendering a 3-D scene of graphical data into a 2-D scene may include dividing 2-D space used to represent the 3-D scene from a viewpoint into a plurality of tiles. The 3-D scene may include a plurality of primitives. The method may include generating visibility information for a first tile of the plurality of tiles. The method may include modifying the visibility information for the first tile to generate modified visibility information for the first tile. The method may include generating the 2-D scene using the modified visibility information for the first tile.

18 Claims, 7 Drawing Sheets

VISIBILITY INFORMATION MODIFICATION

TECHNICAL FIELD

This disclosure relates to graphics processing.

BACKGROUND

Computing devices often utilize a graphics processing unit (GPU) to accelerate the rendering of graphical data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution.

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

In general, this disclosure describes techniques for rendering graphical data. For example, one or more techniques of this disclosure include modifying visibility information to optimize rendering in, for example, tile-based rendering.

In one example, this disclosure describes a method comprising dividing a 2-D space used to represent a 3-D scene from a viewpoint into a plurality of tiles, wherein the 3-D scene includes a plurality of primitives; generating visibility information for a first tile of the plurality of tiles, wherein the visibility information for the first tile includes a value for each primitive of the plurality of primitives, wherein the value for each primitive is either a first value or a second value, and wherein the first value indicates a primitive with which the first value is associated is not to be rendered; modifying the visibility information for the first tile to generate modified visibility information for the first tile; and generating the 2-D scene using the modified visibility information for the first tile.

In another example, this disclosure describes a device comprising a memory for storing rendered graphical data; and one or more processors configured to: divide a 2-D space used to represent a 3-D scene from a viewpoint into a plurality of tiles, wherein the 3-D scene includes a plurality of primitives; generate visibility information for a first tile of the plurality of tiles, wherein the visibility information for the first tile includes a value for each primitive of the plurality of primitives, wherein the value for each primitive is either a first value or a second value, and wherein the first value indicates a primitive with which the first value is associated is not to be rendered; modify the visibility information for the first tile to generate modified visibility information for the first tile; generate a 2-D scene using the modified visibility information for the first tile; and store the 2-D scene in the memory.

In another example, this disclosure describes an apparatus comprising means for dividing a 2-D space used to represent a 3-D scene from a viewpoint into a plurality of tiles, wherein the 3-D scene includes a plurality of primitives; means for generating visibility information for a first tile of the plurality of tiles, wherein the visibility information for the first tile includes a value for each primitive of the plurality of primitives, wherein the value for each primitive is either a first value or a second value, and wherein the first value indicates a primitive with which the first value is associated is not to be rendered; means for modifying the visibility information for the first tile to generate modified visibility information for the first tile; and means for generating a 2-D scene using the modified visibility information for the first tile.

In another example, this disclosure describes a non-transitory computer-readable storage medium having instructions stored thereon that, when executed, cause one or more processors of a computing device to: divide a 2-D space used to represent a 3-D scene from a viewpoint into a plurality of tiles, wherein the 3-D scene includes a plurality of primitives; generate visibility information for a first tile of the plurality of tiles, wherein the visibility information for the first tile includes a value for each primitive of the plurality of primitives, wherein the value for each primitive is either a first value or a second value, and wherein the first value indicates a primitive with which the first value is associated is not to be rendered; modify the visibility information for the first tile to generate modified visibility information for the first tile; and generate a 2-D scene using the modified visibility information for the first tile.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
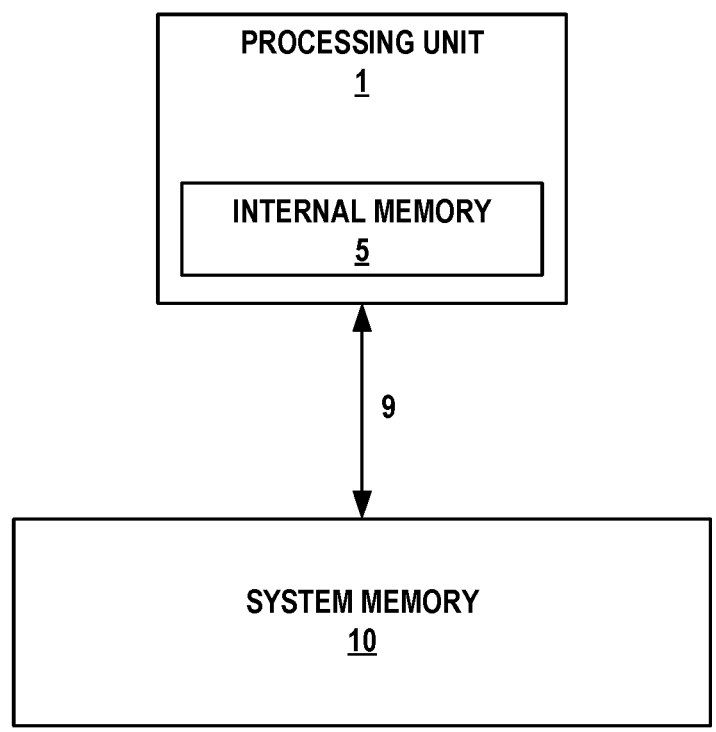
FIG. 1 is a block diagram showing an example processing unit configured to use the techniques of this disclosure.

Processing units configured to render graphics (e.g., processing unit 1 described in more detail below) may be configured to render a three-dimensional scene into a two-dimensional scene (i.e., a two-dimensional representation of the three-dimensional scene from at least one view point, camera point, or the like). To render a three-dimensional scene into a two-dimensional scene, two-dimensional space may be divided up into tiles (sometimes called bins) by such processing units in a process known as tile-based rendering, or more simply, binning. The two-dimensional space may be used to represent the three-dimensional scene from a particular viewpoint. In some examples, the two-dimensional space may be described as having X and Y coordinate dimensions where X and Y may or may not be equal to one another. The three-dimensional scene may be processed on a per-tile basis, and reconstructed into the two-dimensional scene in, for example, a frame buffer after processing each tile individually. In general, the techniques of this disclosure are directed to techniques for tile-based rendering of a three-dimensional scene into a two-dimensional scene.

Tile-based rendering may be described with respect to a number of processing passes. For example, as described herein, when performing tile-based rendering, processing unit 1 may be configured to perform a binning pass and a plurality of rasterization passes (e.g., two or three rasterization passes). These rasterization passes as well as other details are described in more detail below. In some examples, a first rasterization pass may be considered to be part of the binning pass, and a second rasterization pass may be considered to be part of a rendering pass (e.g., the pass that follows the binning pass). In other examples, a first rasterization pass and a second rasterization pass may be considered to be part of the binning pass, and a third rasterization pass may be considered to be part of a rendering pass (e.g., a rasterization pass that follows the binning pass).

With respect to the binning pass, processing unit 1 may be configured to receive and process draw commands for a particular scene. Each draw call may include one or more primitives, each of the one or more primitives having one or more vertices. Processing unit 1 may be configured to generate position data (e.g., coordinate data, such as three-axis (X, Y, Z) coordinate data) in screen space for each vertex of each primitive in the draw commands for a particular scene.

During the binning pass, processing unit 1 may also be configured to divide an entire frame of a three-dimensional scene into a plurality of tiles (sometimes referred to as bins). As used herein, reference to dividing a three-dimensional scene into a plurality of tiles refers to dividing two-dimensional space used to represent the three-dimensional scene from a particular view point into a plurality of tiles. In some examples, processing unit 1 may be configured to generate visibility information for each tile of the plurality of tiles during the binning pass before rasterization of each respective tile.

For example, processing unit 1 may be configured to generate visibility information for each tile before respective rasterization of each tile occurs. In this regard, it is understood that processing unit 1 may be configured to generate visibility information on a per-tile basis (e.g., visibility information is generated for each tile) before rasterizing the tile for which the visibility information is generated. For example, processing unit 1 may be configured to first generate visibility information for each tile, and then perform additional processing after the visibility information for each tile has been generated. Additional processing, as described herein, may refer to modifying visibility information on a per tile basis and rendering (e.g., performing a rendering pass) on a per tile basis.

As another example, assume processing unit 1 divides a particular scene into two tiles: a first tile and a second tile. In this particular example, processing unit 1 may be configured to generate visibility information for the first tile before rasterizing the first tile. Similarly, processing unit 1 may be configured to generate visibility information for the second tile before rasterizing the second tile. In yet another example, processing unit 1 may be configured to treat the entire scene as a single tile. In such an example, processing unit 1 may be configured to generate visibility information for the scene tile before rasterizing the scene. It also understood that in this particular example, the entire scene may be referred to as tile with the understanding that that the scene comprises a single tile. In this regard, it is understood that the techniques described herein may apply to graphics rendering techniques in which tile-based rendering is not used. For example, the techniques described herein may enhance the graphics rendering of a scene when the scene is not divided into a plurality of tiles.

In other examples, processing unit 1 may be configured to generate visibility information for each tile of the plurality of tiles during the binning pass before the rendering pass for each respective tile. For example, processing unit 1 may be configured to generate visibility information for each tile before performing a respective rendering pass on each tile occurs. As used herein, a rendering pass may include a full vertex shading process (e.g., a vertex shading process that does not only generate position data). For example, a full vertex shading process may generate position data, color data, and other vertex shading data, whereas a position only vertex shading process may generate only position data. In this regard, before performing a rendering pass may refer to before performing a full vertex shading process. A full vertex shading process may be performed by a vertex shader of processing unit 1 configured to perform a full vertex shading process. It is understood that processing unit 1 may be configured to generate visibility information on a per-tile basis (e.g., visibility information is generated for each tile) before performing a rendering pass on each respective tile for which the visibility information is generated. For example, processing unit 1 may be configured to first generate visibility information for each tile, and then perform additional processing after the visibility information for each tile has been generated. Additional processing, as described herein, may refer to modifying visibility information on a per tile basis and rendering (e.g., performing a rendering pass) on a per tile basis.

In some examples, processing unit 1 may be configured to generate visibility information for each tile following a position only vertex shading process but before a full vertex shading process. In such examples, processing unit 1 may be configured to use position data output from a position only vertex shading process (e.g., a vertex shader of processing unit 1 configured to output only position data) to generate the visbility information for each tile.

As another example, assume processing unit 1 divides a particular scene into two tiles: a first tile and a second tile. In this particular example, processing unit 1 may be configured to generate visibility information for the first tile before performing a rendering pass on the first tile (e.g., before performing a full vertex shading process for the first tile). Similarly, processing unit 1 may be configured to generate visibility information for the second tile before performing a rendering pass on the second tile (e.g., before performing a full vertex shading process for the second tile). It is also understood that, in some examples, processing unit 1 may be configured to generate visibility information on a per-tile basis (e.g., visibility information is generated for each tile) before performing a rendering pass on any and all tiles.

As described above, processing unit 1 may be configured to treat the entire scene as a single tile. In such an example, processing unit 1 may be configured to generate visibility information for the scene tile before performing a rendering pass on the scene. It also understood that in this particular example, the entire scene may be referred to as tile with the understanding that that the scene comprises a single tile. In this regard, it is understood that the techniques described herein may apply to graphics rendering techniques in which tile-based rendering is not used. For example, the techniques described herein may enhance the graphics rendering of a scene when the scene is not divided into a plurality of tiles.

As used herein, "visibility information" may, in some examples, refer to any information in any data structure that indicates whether one or more primitives associated is not visible or may be visible with respect to the tile (or scene, where tile-based rendering is not used) for which the visibility information was generated. For example, "visibility information" may refer to any information in any data structure that indicates whether one or more primitives associated with one or more draw commands is not visible or may be visible with respect to the tile (or scene, where tile-based rendering is not used) for which the visibility information was generated, and is therefore associated. As another example, "visibility information" may be described as a visibility stream that includes a sequence of 1's and 0's with each "1" or "0" being associated with a particular primitive. Each "1" may indicate that the primitive is or will be visible in the final rendered 2-D scene, and each "0" may indicate that the primitive may be visible (e.g., possibly visible) in the final rendered 2-D scene. In other examples, "visibility information" may refer to a data structure comprising visibility information in a format different from a visibility stream.

In some examples, "visibility information" may, as described herein, refer to any information in any data structure that indicates whether one or more primitives associated will not be rendered or will be rendered with respect to the tile (or scene, where tile-based rendering is not used) for which the visibility information was generated. For example, "visibility information" may refer to any information in any data structure that indicates whether one or more primitives associated with one or more draw commands will not be rendered or will be rendered with respect to the tile (or scene, where tile-based rendering is not used) for which the visibility information was generated, and is therefore associated. As another example, "visibility information" may be described as a visibility stream that includes a sequence of 1's and 0's with each "1" or "0" being associated with a particular primitive. Each "1" may indicate that the primitive will be rendered, and each "0" may indicate that the primitive will not be rendered.

For example, it is understood that visibility information may be described as including information that indicates which primitives will not be rendered (e.g., primitives described herein as not being visible and/or that will not be visible in the final rendered 2-D scene) on a per tile basis. Similarly, it is understood that visibility information may be described as including information that indicates which primitives will be rendered (e.g., primitives described herein as being visible or possibly visible, and/or or that will be visible or will possibly be visible in the final rendered 2-D scene) on a per tile basis.

Additional descriptions of what "visibility information" may refer to may be found throughout this disclosure. Similarly, descriptions of what "modified visibility information" may refer to may be found throughout this disclosure.

It is understood that "visibility information" and "modified visibility information" may refer to any description, definition, or the like of such term as described herein unless expressly limited to a particular definition. For example, while a process may be described as pertaining to visibility information (or modified visibility information) as it relates to one exemplary definition set forth herein, it is understood that the described process may also apply using any other definition of visibility information (or modified visibility information).

As used herein, a final rendered 2-D scene may refer to a 2-D scene written to a frame buffer, where the 2-D scene is derived from (i.e., rendered from) a 3-D scene. For example, with this understanding, a final rendered 2-D scene may similarly refer to the final rendered pixels rendered from a 3-D scene. In some examples, the final rendered 2-D scene or final rendered pixels may be referred to as an image, a frame, or the like.

As described herein, a primitive may be referred to as being visible in a tile or scene. However, it is understood that that depending on the processing point (e.g., stage) in the graphics pipeline, such a reference may refer to the fact that the primitive will be visible in the final rendered 2-D scene. Similarly, a primitive may be referred to as being not visible in a tile or scene. However, it is likewise understood that depending on the processing point (e.g., stage) in the graphics pipeline, such a reference may refer to the fact that the primitive may not be visible in the final rendered 2-D scene. The final rendered 2-D scene may refer to the 2-D scene written to the frame buffer for presentment by a display. It is understood that that the final rendered 2-D scene written to a frame buffer may be further processed (e.g., by a display processor) before actual presentment by a display.

As used herein, a primitive that "may be visible" may refer to the fact that it is unknown whether the primitive will be visible or will not be visible in the final rendered 2-D scene at a particular processing point in a graphics pipeline (e.g., during the binning pass before rasterization) according to one example. In another example, a primitive that "may be visible" may refer to a primitive that is not or will not be definitively visible in the final rendered 2-D scene at a particular processing point in a graphics pipeline (e.g., during the binning pass before rasterization).

It is understood that industry generally refers to a visibility stream as identifying whether a primitive is not visible or is actually visible. However, such reference is for sake of convenience because, as described herein, the visibility information (such as a visibility stream when structured as such) described herein may be modified to be more accurate by identifying primitives that are actually not visible that used to be identified as possibly visible. In this regard, it is understood that the normal parlance of visibility stream may be inaccurate depending on the context. The techniques of this disclosure relate to modifying visibility information (such as a visibility stream when structured as such). In some examples, modifying visibility information may reduce or eliminate primitives identified as possibly visible that are actually not visible resulting in a reduction in the consumption of processing resources and the like. In other examples, modifying visibility information may reduce the number (e.g., by one or more) of primitives rendered during the rendering pass for one or more tiles than would otherwise be rendering for the one or more tiles based on unmodified visibility information. In such examples, the consumption of processing resources may be reduced due to rendering one or more less primitives based on the modified visibility information than what would have been rendered during a rendering pass based on the unmodified visibility information.

By modifying visibility information as described herein, rendering of a 3-D scene into a 2-D scene may be optimized. For example, consumption of processing resources may be reduced in later processing stages of a graphics processing pipeline (or more simply graphics pipeline). As a more specific example, consumption of processing resources may be reduced in later processing stages such as a full vertex shader stage and/or any stage after a full vertex shader stage (e.g., a rasterization stage following full vertex shading). As an example, visibility information may control the rendering of the 3-D scene into a final rendered 2-D version of the scene by controlling which primitives are rendered and not rendered during the rendering pass for each tile. For example, during the rendering pass for each tile, processing unit 1 may be configured to use visibility information to skip (e.g., not render) primitives, such as primitives identified as being not visible. Accordingly, by modifying visibility information as described herein, processing unit 1 is enabled to skip (e.g., not render) even more primitives (e.g., those primitives that were previously identified as being possibly visible in the pre-modified visibility information but identified as being non-visible in the modified visibility information) during rendering pass for each tile by using the modified visibility information, thus reducing the consumption of processing resources (e.g., processing resources used for rendering and shading). Alternatively described, by modifying visibility information as described herein, processing unit 1 is enabled to render less primitives during the rendering pass for each tile by using the modified visibility information, thus reducing the consumption of processing resources (e.g., processing resources used for rendering and shading).

As described herein, "modified visibility information" may refer to any information in any data structure that indicates whether one or more primitives associated with one or more draw commands is not visible or is visible with respect to the tile (or scene, where tile-based rendering is not used) for which the visibility information was generated, and is therefore associated. In view of the techniques described herein, at least one difference between visibility information and modified visibility information is the respective identification of non-visible/possibly visible primitives and non-visible/actually visible primitives. Processing unit 1 may be configured to modify visibility information to generate modified visibility information. For example, where "visibility information" may be described as a visibility stream that includes a sequence of 1's and 0's as set forth above, processing unit 1 may be configured to modify one or more 1's to 0's and/or one or more 0's to 1's using one or more techniques described herein to generate modified visibility information. Each "1" in modified visibility information (e.g., a modified visibility stream) may indicate that the primitive is or will be visible in the final rendered 2-D scene, and each "0" may indicate that the primitive is not visible (i.e., non-visible, invisible, or the like) in the final rendered 2-D scene.

Processing unit 1 may be configured to encode (e.g., compress) visibility information by any means (e.g., by any encoding, compression, or run-length encoding technique), and may similarly be configured to decode any encoded visibility information. In some examples, processing unit 1 may be configured to modify uncompressed visibility information, whether the uncompressed visibility information is in decoded form because it was initially encoded or because the uncompressed visibility information was never encoded). In such examples, processing unit 1 may be configured to decode encoded visibility information to generate decoded (or uncompressed) visibility information; and, in turn, be configured to modify the decoded visibility information. In other examples, processing unit 1 may be configured to modify encoded visibility information. For example, processing unit 1 may be configured to directly modify run-length encoded visibility information. In such an example, processing unit 1 may be configured to determine that the nature of the modification only involves a single value not related to any run-length. For example, a visibility stream may comprise 10100011111. This particular visibility may be compressed using run-length encoding such that according to one example the compressed visibility stream may be represented as 1010214. Processing unit 1 may be configured to modify the bolded values in the compressed visibility stream of 1010214 because the bolded values are not related to any run-length. It is understood that any run-length encoding technique may be used to encode visibility information described herein; and, as such, the 1010214 representation is provided as an example. By directly modifying compressed visibility information, processing unit 1 is configured to save processing resources by avoiding decompressing the compressed information.

As described above, tile-based rendering may be described with respect to a number of processing passes. For example, as described herein, when performing tile-based rendering, processing unit 1 may be configured to perform a binning pass and a plurality of rasterization passes (e.g., two or three rasterization passes). These rasterization passes as well as other details are described in more detail below. In some examples, a first rasterization pass may be considered to be part of the binning pass, and a second rasterization pass may be considered to be part of a rendering pass (e.g., the pass that follows the binning pass). In other examples, a first rasterization pass and a second rasterization pass may be considered to be part of the binning pass, and a third rasterization pass may be considered to be part of a rendering pass (e.g., a rasterization pass that follows the binning pass).

FIG. 1 is a block diagram illustrating an example processing unit that may be configured to implement one or more aspects of this disclosure. As shown in FIG. 1, processing unit 1 may include internal memory 5. Memory external to processing unit 1, such as depicted system memory 10, may be accessible to processing unit 1. For example, processing unit 1 may be communicatively coupled to system memory 10 over a bus (e.g., any communication medium, whether wired or wireless). In some examples, processing unit 1 may be directly communicatively coupled to system memory 10 via a communication medium such as bus 9. In other examples, processing unit 1 may be indirectly communicatively coupled to system memory 10 via a communication medium such as a bus. For example, processing unit 1 may be communicatively directly coupled to another component (e.g., a different processing unit) which is directly communicatively coupled to system memory 10 via a communication medium such as a bus.

Internal memory 5 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

Processing unit 1 may be a central processing unit (CPU), a graphics processing unit (GPU), or any other processing unit that may be configured to perform graphics processing (e.g., render a 3-D scene of graphical data into a 2-D scene of graphical data). Processing unit 1 be integrated into a motherboard of a computing device. In some examples, processing unit 1 may be may be present on a graphics card that is installed in a port in a motherboard of a computing device, or may be otherwise incorporated within a peripheral device configured to interoperate with a computing device. In some examples, processing unit 1 may be on-chip with a CPU, such as in a system on chip (SOC). Processing unit 1 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing. In other examples, processing unit 1 may be configured to perform graphics processing despite not having massive parallel processing capabilities. The techniques of this disclosure apply to any processor that may be configured to perform graphics processing (e.g., a CPU or a GPU). For example, the techniques of this disclosure apply to any processor that may be configured to generate visibility information and modify visibility information. As another example, the techniques of this disclosure apply to any processor that may be configured to receive visibility information and modify the received visibility information.

Figure 2:
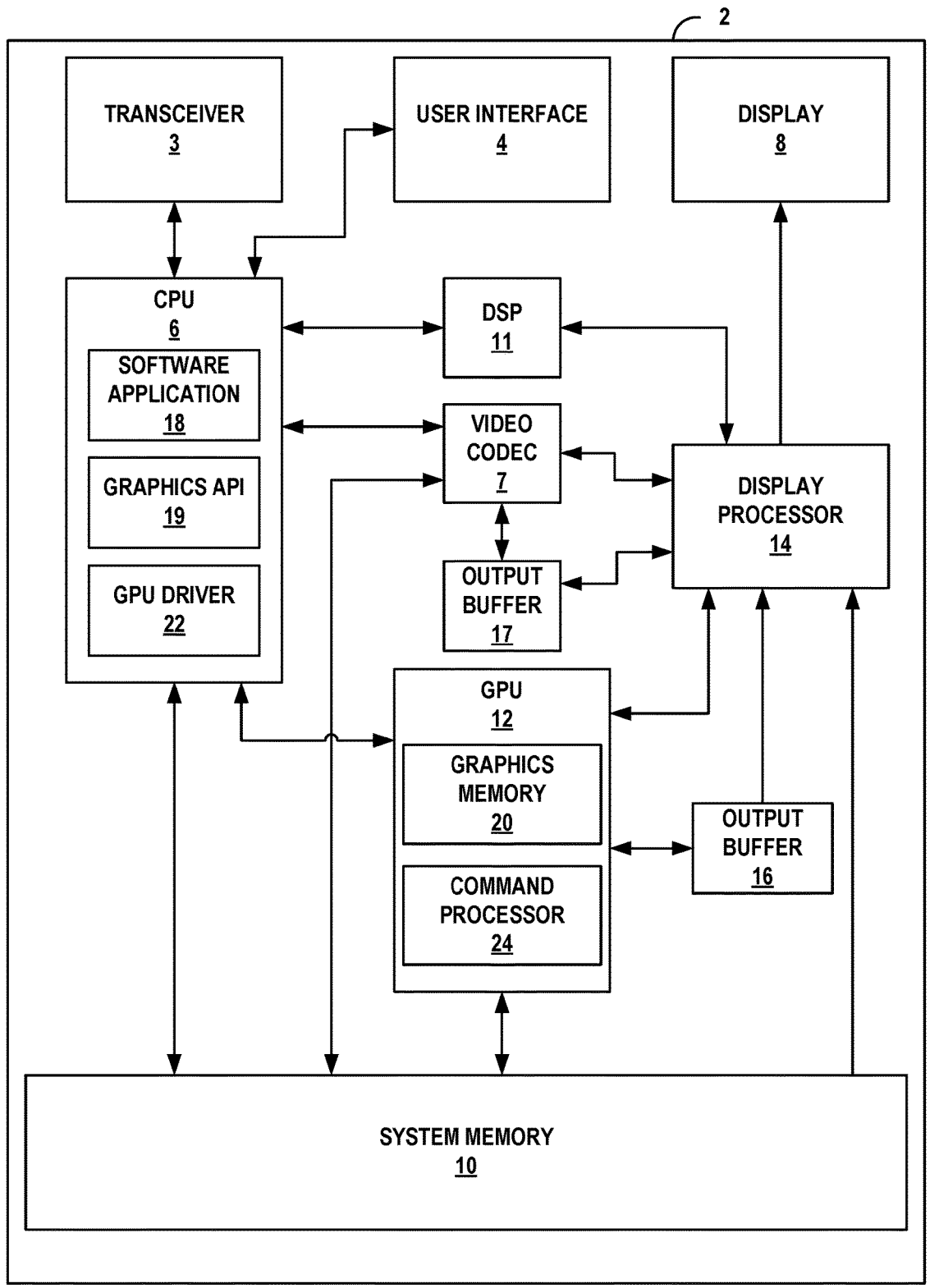
FIG. 2 is a block diagram showing an example computing device configured to use the techniques of this disclosure.

For example, while FIG. 2 is discussed in more detail below, processing unit 1 may be CPU 6, GPU 12, or another component (whether depicted or not) of computing device 2 depicted in FIG. 2. It is understood that the techniques described herein more commonly apply to when processing unit 1 is GPU 12 because a GPU 12 is most commonly used to render graphical data. However, it is also understood that the techniques described herein also apply when a processing unit other than a GPU (e.g., a CPU) is configured to render graphical data. Accordingly, while the techniques of this disclosure are generally described with respect to a GPU, it is understood that this is just one example of a processing unit configured with one or more techniques described herein, and that other processing units may be similarly configured.

In some examples, processing unit 1 may be configured to receive, transmit, and/or generate data (e.g., graphical data) on which one or more graphics processing techniques may be performed. For example, processing unit 1 may be a GPU (e.g., GPU 12) that is configured to receive, transmit, and/or generate data on which one or graphics processing techniques may be performed. Such data may include graphical data received from, for example, a CPU (e.g., CPU 6) or any other source (e.g., any other processing unit or a storage medium such as system memory 10, internal memory 5, or any other memory space). In such an example, graphical data may include one or more draw commands with each draw call including one or more vertices for one or more primitives. In another example, processing unit 1 may be a CPU (e.g., CPU 6) that is configured to receive, transmit, and/or generate data on which one or more graphics processing techniques may be performed. Such data may include graphical data received from, for example, another CPU, a GPU (e.g., GPU 12), or any other source (e.g., any other processing unit or a storage medium such as system memory 10, internal memory 5, or any other memory space). In such an example, graphical data may include one or more draw commands with each draw call including one or more vertices for one or more primitives.

One or more techniques described herein may be implemented in hardware, software, firmware, or any combination thereof. For example, where one or more techniques described herein are implemented in hardware, processing unit 1 may be such hardware or one piece of a plurality of hardware components configured to operate together to perform one or more techniques described herein. In such examples, the hardware may or may not be configured to execute software or firmware that may perform one or more techniques described herein when executed. Any software and/or firmware may be stored on a non-transitory storage medium, such on-chip memory of hardware (e.g., internal memory 5 of processing unit 1) or on external memory to any hardware (e.g., system memory 10).

Processing unit 1 may be configured to perform tile-based rendering as described herein, or any other technique described herein. For example, processing unit 1 may be configured to receive, transmit, generate, and/or modify visibility information (e.g., a visibility stream) as described herein.

FIG. 2 is a block diagram illustrating an example computing device that may be configured to implement one or more aspects of this disclosure. As shown in FIG. 2, computing device 2 may be, for example, a personal computer, a desktop computer, a laptop computer, a tablet computer, a computer workstation, a video game platform or console, a mobile telephone (e.g., a cellular or satellite telephone), a landline telephone, an Internet telephone, a handheld device (e.g., a portable video game device or a personal digital assistant (PDA)), a wearable computing device, a personal music player, a video player, a display (e.g., display device), a television, a television set-top box, a server, an intermediate network device, a mainframe computer, any mobile device, or any other type of device that processes and/or displays graphical data. In the example of FIG. 2, computing device 2 may include central processing unit (CPU) 6, system memory 10, and graphics processing unit (GPU) 12. CPU 6 may be configured to perform image processing in accordance with one or more techniques described herein. GPU 12 may be configured to perform image processing in accordance with one or more techniques described herein.

Computing device 2 may also include display processor 14, transceiver 3, user interface 4, video codec 7, and display 8. In some examples, video codec 7 may be a software application, such as a software application among the one or more software applications 18 configured to be processed by CPU 6 or other components of computing device 2. In other examples, video codec 7 may be a hardware component different from CPU 6, a software application that runs on a component different from CPU 6, or a combination of hardware and software. While the one or more software applications 18 are conceptually shown as inside CPU 6, it is understood that these one or more software applications 18 may be stored in system memory 10, memory external to but accessible to computing device 2, or a combination thereof. The external memory may, for example, be continuously intermittently accessible to computing device 2.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

Computing device 2 may include additional modules or processing units not shown in FIG. 2 for purposes of clarity. For example, computing device 2 may include a speaker and a microphone, neither of which are shown in FIG. 2, to effectuate telephonic communications in examples where computing device 2 is a mobile wireless telephone, or a speaker where computing device 2 is a media player. Computing device 2 may also include a camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as one or more software application 18. The one or more software applications 18 that execute on CPU 6 (or on one or more other components of computing device 2) may include, for example, an operating system, a word processor application, an email application, a spreadsheet application, a media player application, a video game application, a graphical user interface application, or another type of software application that uses graphical data for 2-D or 3-D graphics. As described herein, processing unit 1 may be, for example, one or more components described with respect to FIG. 2. Accordingly it is understood, for example, that processing unit 1 may be configured to execute one or software applications (e.g., one or more software application 18) and/or render graphical data corresponding to one or more executed software applications (e.g., one or more software application 18). Any description relating to any component of FIG. 2 may equally describe one or more examples of processing unit 1.

CPU 6 may be configured to execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

One or more software applications 18 that execute on, for example, CPU 6 may include one or more graphics rendering instructions that instruct CPU 6 to cause the rendering of graphical data to display 8. The instructions may include instructions to process 3-D graphics as well as instructions to process 2-D graphics. In some examples, the software instructions may conform to a graphics application programming interface (API). Graphics API may be, for example, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), a parallel computing platform and API model developed by NVIDIA Corporation such as CUDA (i.e., Compute Unified Device Architecture), or any other public or proprietary standard GPU compute API. In order to process the graphics rendering instructions of one or more software applications 18 executing on CPU 6, CPU 6, during execution of one or more software applications 18, may issue one or more graphics rendering commands to GPU 12 (e.g., through GPU driver 22) to cause GPU 12 to perform some or all of the rendering of the graphical data. In some examples, the graphical data to be rendered may include a list of graphics primitives, e.g., points, lines, triangles, quadrilaterals, triangle strips, etc.

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3-D rendering commands to GPU 12 (e.g., a video game application), an application that causes CPU 6 to offload 2-D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 22, via graphics API, to issue one or more commands to GPU 12 for rendering one or more graphics primitives into displayable graphics images. For example, one or more software applications 18 may invoke GPU driver 22, via graphics API, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

GPU 12 may be configured to perform graphics operations to render one or more graphics primitives to display 8. Thus, when one or more software applications 18 executing on CPU 6 requires graphics processing, CPU 6 may provide graphics rendering commands along with graphical data to GPU 12 for rendering. The graphical data may include, for example, drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2-D) and/or three-dimensional (3-D) graphics scenes) into a frame buffer more quickly than drawing the scenes directly to a frame buffer using CPU 6.

In an example where processing unit 1 is a GPU (e.g., GPU 12), GPU 12 may be configured to render a three-dimensional scene. Rendering of three dimensional scenes can be very memory bandwidth-intensive, and, as such, a specialized graphics memory (GMEM) may be located close to the graphics processing core of the GPU. GPU 12 may be able to access data from the GMEM much faster than it can access data from system memory (e.g., DRAM). A scene can be rendered by, for example, a graphics processing core of GPU 12 to the GMEM, and the scene can be resolved (e.g., stored) to system memory (e.g., system memory 10). However, because the size of the GMEM in certain environments (e.g., a mobile device environment) can be limited due to physical area constraints, GPU 12 may be configured to render a scene using tile-based rendering. For example, GPU 12 may be configured to split or otherwise divide a scene into number of tiles, so that each tile of the scene may be rendered individually. It is understood that GPU 12 may be configured to perform tile-based rendering independent of any type and/or size of memory accessible by GPU 12.

One or more software applications 18 may invoke GPU driver 22, to issue one or more commands to GPU 12 for rendering one or more graphics primitives into displayable graphics images (e.g., displayable graphical data). For example, one or more software applications 18 may, when executed, invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 (e.g., a frame buffer) may store destination pixels for GPU 12. Each destination pixel may be associated with a unique screen pixel location. Similarly, output buffer 17 may store destination pixels for video codec 7 depending on the example. In some examples, output buffer 16 and/or output buffer 17 may store color components and a destination alpha value for each destination pixel. For example, output buffer 16 and/or output buffer 17 may store pixel data according to any format. For example, output buffer 16 and/or output buffer 17 may store Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer for GPU 12. For example, output buffer 16 may be allocated memory space in a memory internal to GPU 12. Further, as described above, output buffer 16 may also be able to store any suitable data other than pixels.

Similarly, although output buffer 17 and system memory 10 are illustrated as being separate memory units, in other examples, output buffer 17 may be part of system memory 10. For example, output buffer 17 may be allocated memory space in system memory 10. Output buffer 17 may constitute a video codec buffer or a frame buffer. Further, as discussed above, output buffer 17 may also be able to store any suitable data other than pixels. In some examples, although output buffer 16 and output buffer 17 are illustrated as being separate memory units, output buffer 16 and output buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC). GPU 12 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. GPU 12 may also include one or more processor cores, so that GPU 12 may be referred to as a multi-core processor. In some examples, GPU 12 may be specialized hardware that includes integrated and/or discrete logic circuitry that provides GPU 12 with massive parallel processing capabilities suitable for graphics processing. In some instances, GPU 12 may also include general-purpose processing capabilities, and may be referred to as a general-purpose GPU (GPGPU) when implementing general-purpose processing tasks (e.g., so-called "compute" tasks).

In some examples, graphics memory 20 may be part of GPU 12. For example, graphics memory 20 may be on-chip memory or memory that is physically integrated into the integrated circuit chip of GPU 12. If graphics memory 20 is on-chip, GPU 12 may be able to read values from or write values to graphics memory 20 more quickly than reading values from or writing values to system memory 10 via a system bus. Thus, GPU 12 may read data from and write data to graphics memory 20 without using a bus. In other words, GPU 12 may process data locally using a local storage, instead of off-chip memory. Such graphics memory 20 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image (e.g., a fully rendered image or scene) in system memory 10 and/or output buffer 16. Display processor 14 may retrieve the image from system memory 10 and/or output buffer 16 and output values that cause the pixels of display 8 to illuminate to display the image (e.g., a final rendered 2-D scene that was rendered from a 3-D scene) stored in system memory 10 and/or output buffer 16. In some examples, display processor 14 may be configured to perform 2-D operations on data to be displayed, including scaling, rotation, blending, and compositing. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computing device 2 via a wired or wireless communications link. For example, display 8 may be a computer monitor or flat panel display connected to a computing device (e.g., personal computer, mobile computer, tablet, mobile phone, etc.) via a cable or wireless link.

CPU 6 processes instructions for execution within computing device 2. CPU 6 may generate a command stream using a driver (e.g., GPU driver 22 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphical data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6.

In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor. CPU 6 may communicate with GPU 12 to direct GPU 12 to execute GPGPU applications via GPU driver 22.

GPU driver 22 may communicate, to GPU 12, one or more command streams that may be executed by shader units of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 2, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units 46. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors of shader units of GPU 12.

Figure 3:
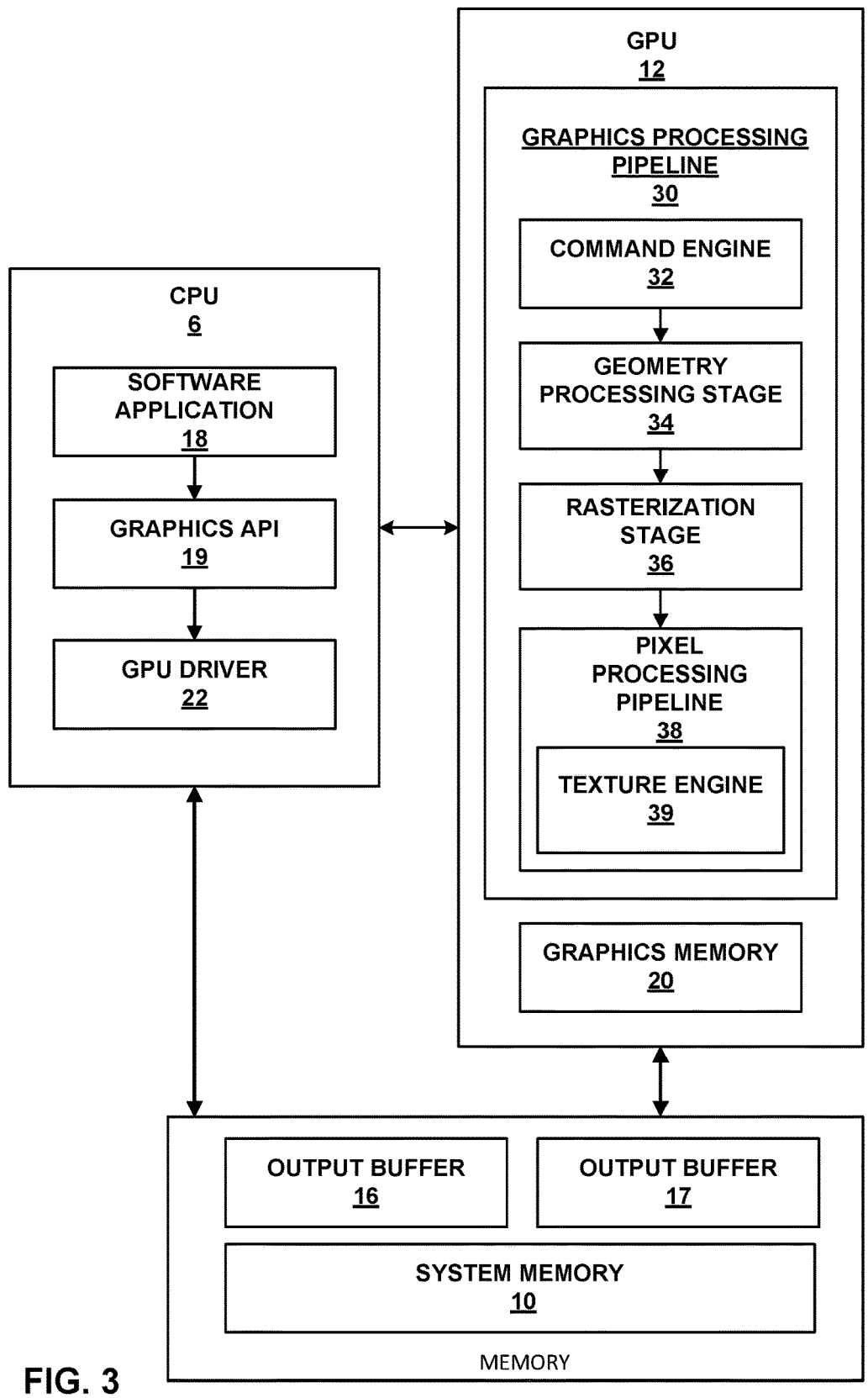
FIG. 3 is a block diagram showing example implementations of certain components of FIG. 2 in more detail.

FIG. 3 is a block diagram illustrating example implementations of CPU 6, GPU 12, and system memory 10 of FIG. 1 in further detail. CPU 6 may include at least one software application 18, graphics API 19, and GPU driver 22, each of which may be one or more software applications or services that execute on CPU 6. GPU 12 may include graphics processing pipeline 30 that includes a plurality of graphics processing stages that operate together to execute graphics processing commands. Graphics processing pipeline 30 is one example of a graphics processing pipeline, and this disclosure applies to any other graphics processing or graphics processing pipeline. GPU 12 may be configured to execute graphics processing pipeline 30 in a variety of rendering modes, including a tile-based rendering mode (which may also be referred to as a binning rendering mode) and a direct rendering mode.

As shown in FIG. 3, graphics processing pipeline 30 may include a plurality of components. In some examples, such components may be referred to as shaders, shader units, shader processors, shader processing units, and the like. In the example shown in FIG. 3, GPU 12 includes but it is not limited to the following components in the graphics processing pipeline 30: command engine 32, geometry processing stage 34, rasterization stage 36, and pixel processing pipeline 38. Pixel processing pipeline 38 may include texture engine 39. Each of the components in graphics processing pipeline 30 may be implemented as fixed-function components, programmable components (e.g., as part of a shader program executing on a programmable shader unit), or as a combination of fixed-function and programmable components. Memory available to or otherwise accessible to CPU 6 and GPU 12 may include, for example, system memory 10, output buffer 16, output buffer 17, and any on-chip memory of CPU 6, and any on-chip memory of GPU 12. Output buffer 16, which may be termed a frame buffer in some examples, may store rendered data (e.g., a 2-D scene rendered from a 3-D scene).

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3-D rendering commands to GPU 12 (e.g., a video game application), an application that causes CPU 6 to offload 2-D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 22, via graphics API 19, to issue one or more commands to GPU 12 for rendering one or more graphics primitives into displayable graphics images. For example, one or more software applications 18 may invoke GPU driver 22, via graphics API 19, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to memory (e.g., output buffer 16) accessible by display processor 14. Graphics processing pipeline 30 (which may also be referred to as graphics pipeline 30) may be configured to execute in one of a plurality of different rendering modes, including a tile-based rendering mode and a direct rendering mode.

GPU driver 22 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via GPU driver 22, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Graphics processing pipeline 30 may be configured to execute in one of a plurality of different rendering modes, including a tile-based rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The draw commands (sometimes referred to as drawing commands, drawing calls, or draw calls) may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. In some examples, geometry processing stage 34 may constitute a vertex shader. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

Geometry processing stage 34 may function as a triangle setup engine (TSE). A TSE is responsible for, among other things, producing edge equations which may be used by rasterization stage 36 to generate fragments. In order for the TSE to calculate the edge coefficients used in the edge equations, the TSE is provided with the vertex coordinates in screen-space. In other examples, geometry processing stage 34 may In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques such as, e.g., an edge-walking technique, evaluating edge equations, or the like. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 (e.g., a pixel shader unit or a fragment shader unit) is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in output buffer 16. The destination pixel data may be associated with a destination pixel in output buffer 16 that has the same display location as the source pixel that was processed. The destination pixel data may include data such as, e.g., color values, destination alpha values, depth values, etc.

Pixel processing pipeline 38 may include texture engine 39. Texture engine 39 may include both programmable and fixed function hardware designed to apply textures (texels) to pixels. Texture engine 39 may include dedicated hardware for performing texture filtering, whereby one or more texel values are multiplied by one or more pixel values and accumulated to produce the final texture mapped pixel.

As described above, GPU 12 may be configured to render a 3-D scene into a 2-D scene (which may also be referred to as rendering a 3-D scene into a 2-D image of the 3-D scene) using tile-based rendering.

Figure 4:
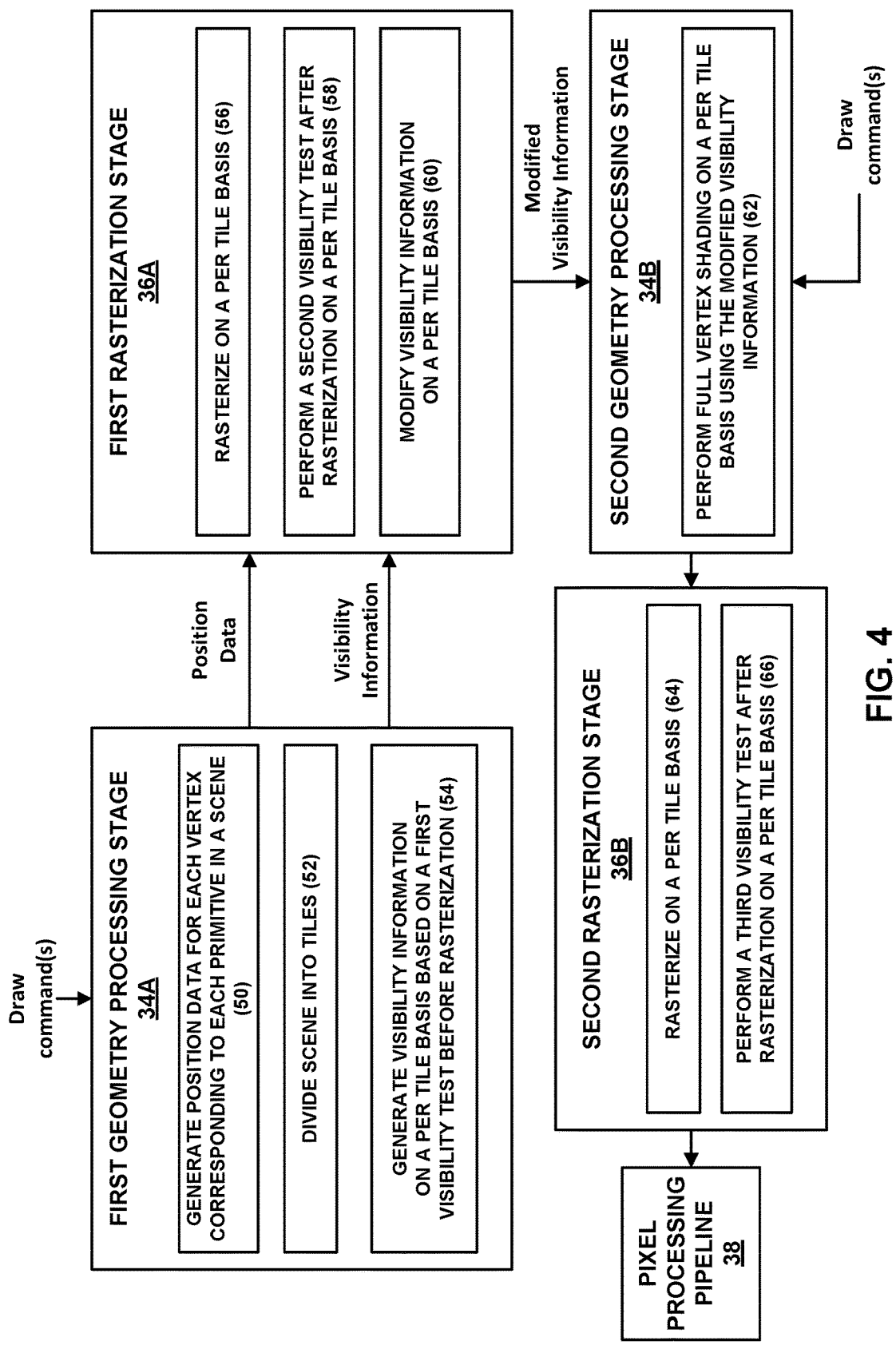
FIG. 4 illustrates one example of processing graphical data in accordance with one or more techniques set forth herein.

FIG. 4 illustrates one example of processing graphical data in accordance with one or more techniques set forth herein.

GPU 12 may be configured to receive and/or generate one or more draw commands. GPU 12 may be configured to process these one or more draw commands in, for example, geometry processing stage 34 of graphics processing pipeline 30. Each draw command may include one or more primitives with each of the one or more primitives having one or more vertices. In the example of shown in FIG. 4, GPU 12 may be configured to process one or more draw commands in, for example, a first geometry processing stage 34A and a second geometry processing stage 34B. Otherwise stated, GPU 12 may be configured to process one or more draw commands in a first pass of geometry processing stage 34 (e.g., first geometry processing stage 34A) and in a second pass of geometry processing stage 34 (e.g., second geometry processing stage 34B).

Referring to first geometry processing stage 34A, GPU 12 may be configured to only generate position data (e.g., coordinate data, such as three-axis (X, Y, Z) coordinate data) for each vertex corresponding to a plurality of primitives (e.g., all the primitives) in a 3-D scene, such as that shown in block 50. For example, GPU 12 may be configured to generate position data once per vertex, and the connectivity information per primitive may be encoded into an input index buffer. The plurality of primitives may be defined by one or more draw commands corresponding to the 3-D scene.

As set forth herein, GPU 12 may be configured to perform tile-based rendering by dividing a 3-D scene in a plurality of tiles, such as that shown in block 52. As used herein, reference to dividing a 3-D scene into a plurality of tiles refers to dividing 2-D space used to represent the three-dimensional scene from a particular view point into a plurality of tiles. In some examples, the 2-D space may be divided into two tiles, three tiles, four tiles, or any number of tiles. In other examples, GPU 12 may be configured to perform one or more techniques set forth herein without using tile-based rendering on the 3-D scene. For example, GPU 12 may be configured to generate visibility information for the 3-D scene as a whole (instead of on a per tile basis), and modify such visibility information as set forth herein.

In some examples, GPU 12 may be configured to generate visibility information on a per tile basis (e.g., a tile-by-tile basis). In other examples, GPU 12 may be configured to generate visibility information for all tiles at the same time on a per tile basis (i.e., the visibility information for each tile is generated at the same time). GPU 12 may be configured to generate the visibility information before rasterization of the tile for which the visibility information is generated. GPU 12 may be configured to generate visibility information before performing any z-test (sometimes referred to as a depth test). In some examples, the visibility information generated for each tile may indicate which primitives(s) in the 3-D scene will not be visible in the final rendered 2-D scene, and may also indicate which primitive(s) in the 3-D scene will possibly be visible in the final rendered 2-D scene.

The visibility information generated for each tile may include a value for each primitive in the 3-D scene (e.g., each primitive defined by each draw command associated with the 3-D scene). In such examples, the value for each primitive may include, for example, a binary value or another type of value. For example, the value for each primitive may include one of two values: a first value or a second value. The first value may indicate that a primitive corresponding to the first value will not be visible in the final rendered 2-D scene for the tile with which the visibility information corresponds. The second value may indicate that a primitive corresponding to the second value will possibly be visible in the final rendered 2-D scene for the tile with which the visibility information corresponds. In some examples, a value of "0" may be used to indicate which primitive(s) in the 3-D scene will not be visible in the final rendered scene for each particular tile, and a value of "1" may be used to indicate which primitive(s) in the 3-D scene will possibly be visible in the final rendered scene for each particular tile.

In some examples, such as that shown in FIG. 4, GPU 12 may be configured to generate visibility information on a per tile basis based on a first visibility test before rasterization of the tile for which the visibility information is generated, such as that shown in block 54. While the visibility information is generated on a per tile basis, it is understood that this means that each tile has visibility information associated therewith and that the visibility information may be generated for each tile at the same time. In some examples, the first visibility test may not include or otherwise be based on any z-test (sometimes referred to as a depth test). Exemplary z-tests include any pixel level z-test (e.g., a high resolution z-test), any block level z-test (e.g., a low resolution z-test), and any hybrid thereof. Otherwise described, GPU 12 may be configured to generate visibility information not using a z-test meaning that the visibility information is not based on a z-test. Instead, the first visibility test may include any test that may be performed on a per tile basis that is not a z-test and/or that is a test that does not require rasterization of the tile for which the test is being performed. For example, the first visibility test may include one or more of the following: determining whether any of the plurality of primitives in the will not be visible in the final rendered 2-D scene by determining whether any of the plurality of primitives (1) are backward facing, (2) have zero area, or (3) have zero area in the tile being processed (e.g., the primitive is not present in the particular tile). In such an example, GPU 12 may be configured to perform the first visibility test. In some examples, GPU 12 may be configured to perform the entire first visibility test on a per tile basis. In some examples, one or more techniques described with respect to the first visibility test may take into account the position data generated at block 50 by, for example, a position only vertex shader, which may be done once per scene. The first visibility test may include primitive projection based on the generated position data.

In other examples, GPU 12 may be configured to perform one or more aspects of the first visibility test on the 3-D scene as a whole, and one or more aspects of the first visibility test on a per tile basis. In such examples, GPU 12 may be configured to determine which primitives are backward facing or have zero area for the entire 3-D scene because regardless of which tiles such primitives are associated with, such primitives will not be visible in the final rendered 2-D scene by virtue of being backward facing and/or having zero area. By performing these two determinations on a global level (i.e., for the entire scene instead of on a tile-by-tile basis), GPU 12 is configured to save (e.g., reduce the consumption of) processing resources by avoiding having to make the same determination(s) (e.g., whether a primitive is backward facing and/or has zero area) more than once since such determination(s) are tile-independent. Determinations that are tile-independent are those that apply to all tiles. For example, a backward facing primitive is backward facing for all tiles regardless and can be identified in visibility information as not being visible in the final rendered 2-D image. Further explained using a four tile example, a backward facing primitive may have area in three tiles and zero area in the fourth tile. However, by determining that the primitive is backward facing, GPU 12 has determined that the primitive is not visible regardless of whether the primitive has any area in any tile. Accordingly, GPU 12 may be configured to store such a determination to skip any other test associated with the first visibility test (e.g., has zero in the tile being processed) when later generating visibility information on a tile-by-tile basis.

In some examples, GPU 12 may be configured to encode generated visibility information for each tile using any encoding technique, such as any run-length encoding technique. For example, GPU 12 may be configured to run-length encode visibility information in examples where visibility information is represented as a series (e.g., a string) of 0s and 1s.

GPU 12 may be configured to rasterize tiles on a per-tile basis in a first rasterization stage 36A, such as that shown in block 56. For example, GPU 12 may be configured to rasterize on a per-tile basis using position data generated in the first geometry processing stage 34A. As another example, GPU 12 may be configured to rasterize on a per-tile basis using visibility information. In such an example, GPU 12 may be configured to only rasterize the primitives not identified in the visibility information as non-visible, not being visible, that will not be visible, or that will not be rendered, or the like. Otherwise stated, GPU 12 may be configured to only rasterize the primitives identified in the visibility information as possibly visible, that will possibly visible, that will be rendered, or the like. As one example, take for instance an example where visibility information includes a first value indicating that a primitive corresponding to the first value will not be visible in the final rendered 2-D scene for the tile with which the visibility information corresponds, and a second value indicating that a primitive corresponding to the second value will possibly be visible in the final rendered 2-D scene for the tile with which the visibility information corresponds. GPU 12 may be configured to rasterize only primitives that have a corresponding value of the second value.

GPU 12 may be configured to perform a second visibility test after rasterization on a per-tile basis, such as that shown in block 58. For example, GPU 12 may be configured to perform a second visibility test on a rasterized tile. In some examples, the second visibility test may include or otherwise be based on any z-test. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, GPU 12 may be configured to perform a second visibility test, with the second visibility test using or otherwise being based on a z-test. In other examples, the second visibility test may not use or otherwise be based on a z-test. For example, the second visibility test may include any other occlusion culling technique that does not constitute a z-test and is performed after rasterization.

GPU 12 may be configured to modify visibility information on a per tile basis, such as that shown in block 60. In examples where GPU 12 is configured to encode generated visibility information for each tile, GPU 12 may be configured to decode any encoded visibility information. For example, GPU 12 may be configured to perform a decoding process that is the reciprocal of the encoding process. As set forth herein, GPU 12 may be configured to modify visibility information, whether or not in encoded form. Generally, however, GPU 12 is configured to modify uncompressed visibility information. Uncompressed visibility information may constitute decoded visibility information or visibility information that was never encoded.

As used herein, modifying visibility information may similarly refer to changing, adjusting, altering, or revising the visibility information. Modifying visibility information does not include encoding or decoding visibility information. While encoding or decoding visibility information does in fact transform the visibility information into an encoded or decoded state, respectively, this is not the type of modification contemplated. In some examples, GPU 12 may be configured to modify visibility information on a per tile basis based on the second visibility test that is performed on a per tile basis. For example, GPU 12 may be configured to generate visibility information for a first tile, and may be configured to generate visibility information for a second tile after generating the visibility information for the first tile. GPU 12 may be configured to rasterize the first tile, perform the second visibility test on the rasterized first tile, and modify the visibility information for the first tile based on, for example, the second visibility test performed for the first tile. Similarly, GPU 12 may be configured to rasterize the second tile, perform the second visibility test on the rasterized second tile, and modify the visibility information for the second tile based on, for example, the second visibility test performed for the second tile. In some examples, generation of the visibility information on a per tile basis in first geometry processing stage 34A may be performed in parallel with the first rasterization stage 36A. For example, GPU 12 may be configured to process a first tile in the first rasterization stage 36A while generating visibility information for a second tile in the first geometry processing stage 34A. In this example, it is understood that the first tile reached the first rasterization stage 36A by virtue of GPU 12 having had processed the first tile in first geometry processing stage 34A.

As set forth above, visibility information generated for each tile may include a value for each primitive in the 3-D scene (e.g., each primitive defined by each draw command associated with the 3-D scene). In such examples, GPU 12 may be configured to modify visibility information by modifying at least one value of the visibility information (e.g., by modifying a first value to a second value and/or modifying a second value to a first value). For example, based on the results of the second visibility test for a first tile, GPU 12 may be configured to modify one or more values of the visibility information generated for the first tile. As another example, based on the results of the second visibility test for a second tile, GPU 12 may be configured to modify one or more values of the visibility information generated for the second tile.

As described above, in some examples, a value of "0" may be used to indicate which primitive(s) in the 3-D scene will not be visible in the final rendered scene for each particular tile, and a value of "1" may be used to indicate which primitive(s) in the 3-D scene will possibly be visible in the final rendered scene for each particular tile. In such examples, GPU 12 may be configured to modify visibility information by modifying at least one value of the visibility information from a value of "1" to a value of "0" and/or modifying at least one value of the visibility information from a value of "0" to a value of "1." Such modification may be based on the second visibility test (e.g., any result(s) from the second visibility test).

In some examples, following modification of visibility information for a tile, the modified visibility information for that tile may indicate which primitives(s) in the 3-D scene will not be visible in the final rendered 2-D scene, and may also indicate which primitive(s) in the 3-D scene will be visible in the final rendered 2-D scene. For example, by performing the second visibility test after rasterization, GPU 12 may be configured to determine (and identify via the modified visibility information) which primitives will actually be visible in the final rendered 2-D scene instead of determining which primitives will possibly be visible in the final rendered 2-D scene. In examples where the visibility information generated for each tile includes a value for each primitive in the 3-D scene (e.g., each primitive defined by each draw command associated with the 3-D scene), then so too does any modified visibility information.

In such examples, the value for each primitive in modified visibility information may have a different attributed meaning. For example, the value for each primitive may include one of two values in the modified visibility information: a first value or a second value. The first value may indicate that a primitive corresponding to the first value will not be visible in the final rendered 2-D scene for the tile with which the modified visibility information corresponds. The second value may indicate that a primitive corresponding to the second value will be visible in the final rendered 2-D scene for the tile with which the modified visibility information corresponds instead of indicating that a primitive corresponding to the second value will possibly be visible in the final rendered 2-D scene. For example, a value of "0" may mean the same thing in visibility information and modified visibility information, whereas a value of "1" may have different meanings in visibility information and modified visibility information. However, it is understood that the value of "1" (or any other second value) carries the same meaning in that it controls which primitives are rendered for a particular tile during, for example, the rendering pass (e.g., second rasterization stage 36B discussed below). In this regard, it is understood that visibility information may be described as including information that indicates which primitives will not be rendered (e.g., primitives described herein as not being visible and/or that will not be visible in the final rendered 2-D scene) on a per tile basis. Similarly, it is understood that visibility information may be described as including information that indicates which primitives will be rendered (e.g., primitives described herein as being visible or possibly visible, and/or or that will be visible or will possibly be visible in the final rendered 2-D scene) on a per tile basis.

It is understood that the second visibility test performed after rasterization may or may not include error. For example, a low resolution z-test includes more error than a high resolution z-test, but the low resolution z-test is more cost effective from a resource consumption standpoint. Accordingly, as set forth herein, reference to a primitive as being visible (e.g., will be visible) in the final rendered 2-D scene may, within the realm of error associated with the second visibility test performed, refer to a primitive that will not actually be visible in the final rendered 2-D scene. For example, in an example where the second visibility test is a low resolution z-test and the third visibility test performed during a second rasterization stage (discussed in more detail below) is a high resolution z-test, this may result in a few primitives having to be rendered that do not actually contribute to the final rendered 2-D scene. However, it is understood that even considering this error, GPU 12 is configured to reduce or eliminate primitives identified as possibly visible in visibility information that are actually not visible. Accordingly, as set forth herein, reference to a primitive as being visible (e.g., will be visible) in the final rendered 2-D scene may, due to any error associated with the second visibility test performed, refer to a primitive that will be possibly be visible in the final rendered 2-D scene. In this example, primitives identified as being possibly visible in modified visibility information are more likely to be visible in the final rendered 2-D scene compared to primitives identified as being possibly visible in visibility information.

In some examples, first geometry processing stage 34A and first rasterization stage 36A may be referred to as the binning pass (or tiling pass). As described above, GPU 12 may be configured to sort a scene into a plurality of tiles for processing on a per tile basis (e.g., a tile-by-tile basis) in the binning pass. All draw commands for the 3-D scene may be processed during the binning pass. In some examples, first geometry processing stage 34A and first rasterization stage 36A may be referred to as the binning pass (or tiling pass) since full vertex shading may not performed on any tile during these stages. Rather, first geometry processing stage 34A and first rasterization stage 36A prepare each tile for rendering in the rendering pass. In some examples, the rendering pass may be considered to start at second geometry processing stage 34B since full vertex shading may be performed on a per tile basis.

Referring to second geometry processing stage 34B, GPU 12 may be configured to perform full vertex shading on a per tile basis using the modified visibility information for each tile (to the extent that performing the second visibility test resulted in modification of visibility information), such as that shown in block 62. For example, it is understood that GPU 12 may be configured to modify but need not actually modify visibility information based on the second visibility test. As a 3-D scene becomes more complex, the likelihood of not modifying visibility information based on the second visibility test may reduce. Similarly, the likelihood of not modifying visibility information based on the second visibility test may increase as a 3-D scene becomes more simplistic. As an example, GPU 12 may, depending on the second visibility test performed for each tile, be configured to modify, during the binning pass, visibility information for one or more tiles; and may be configured to not modify, during the binning pass, visibility information for one or more tiles.

Referring back to second geometry processing stage 34B, GPU 12 may be configured to generate position data (e.g., coordinate data, such as three-axis (X, Y, Z) coordinate data) as well as other data for full vertex shading (e.g., color data) for each vertex corresponding to each primitive on a per-tile basis based on modified (or in some examples, unmodified) visibility information. The plurality of primitives (e.g., all the primitives) may be defined by one or more draw commands corresponding to the 3-D scene.

As an example, GPU 12 may be configured to draw vertices in screen space based on, for example, modified visibility information on a per tile basis. In such an example, GPU 12 may be configured to only draw vertices in screen space that are associated with primitives not identified in the modified visibility information as non-visible, not being visible, that will not be visible, or that will not be rendered, or the like. Otherwise stated, GPU 12 may be configured to draw vertices in screen space that are associated with primitives identified in the modified visibility information as visible, that will be visible, that will be rendered, or the like. As one example, take for instance an example where modified visibility information includes a first value indicating that a primitive corresponding to the first value will not be visible in the final rendered 2-D scene for the tile with which the visibility information corresponds, and a second value indicating that a primitive corresponding to the second value will be visible in the final rendered 2-D scene for the tile with which the visibility information corresponds. GPU 12 may be configured to only draw vertices in screen space that are associated with primitives that have a corresponding value of the second value.

Following second geometry processing stage 34B, GPU 12 may be configured to rasterize tiles on a per-tile basis in a second rasterization stage 36B, such as that shown in block 64. Accordingly, GPU 12 may be configured to rasterize tiles twice: a first time during the first rasterization stage 36A and a second time during the second rasterization stage 36B. The first rasterization of each tile may be performed so that the second visibility test may be performed. The second rasterization of each tile may be performed to provide pixel information to pixel processing pipeline 38. In some examples, GPU 12 may be configured to perform a third visibility test. The third visibility test may be performed on each rasterized tile generated during the second rasterization stage 36B, such as that shown in block 66.

The third visibility test may or may not be the same as the second visibility test. In examples where the third and second visibility tests are the same, GPU 12 may be configured to re-use any information generated from the second visibility test. For example, where the second and third visibility test are both a z-test of the same type (e.g., both tests are a low resolution z-test, a high resolution z-test, etc), GPU 12 may be configured to re-use any resultant information from GPU 12 performing the second visibility test for the third visibility test. In some examples, if the test is the same, GPU 12 may be configured to not perform the third visibility test, and instead just re-use information generated from the second visibility test. By re-using previously calculated test information, GPU 12 may be configured to reduce the consumption of processing resources in this manner.

In some examples, the third visibility test may include or otherwise be based on any z-test. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, GPU 12 may be configured to perform a third visibility test, with the third visibility test using or otherwise being based on a z-test. In other examples, the third visibility test may not use or otherwise be based on a z-test. For example, the third visibility test may include any other occlusion culling technique that does not constitute a z-test and is performed after rasterization.

Following the second rasterization stage 36B, GPU 12 may be configured to perform pixel processing in pixel processing pipeline 38.

FIG. 4 describes GPU 12 as modifying visibility information as part of the first rasterization stage 36A. However, it is understood that this is one example, and that GPU 12 may be configured to modify visibility information as part of another stage before the second geometry processing stage 34B (e.g., before full vertex shading occurs) or as part of a new stage in the graphics pipeline. For example, GPU 12 may be configured to modify visibility information in what may be termed a visibility information modification stage. The visibility information modification stage may be positioned at any stage between the first rasterization pass (e.g., first rasterization stage 36A) of a tile in the binning pass and a second geometry processing stage (e.g., second geometry processing stage 34B).

It is also understood that GPU 12 may be configured to process a different tile at each of the various stages. For example, GPU 12 may be configured to process a tile in the binning pass while the GPU is processing a different tile in the rendering pass. By processing more than one tile in parallel at various stages in the graphics pipeline, GPU 12 is configured to optimize rendering.

Figure 5:
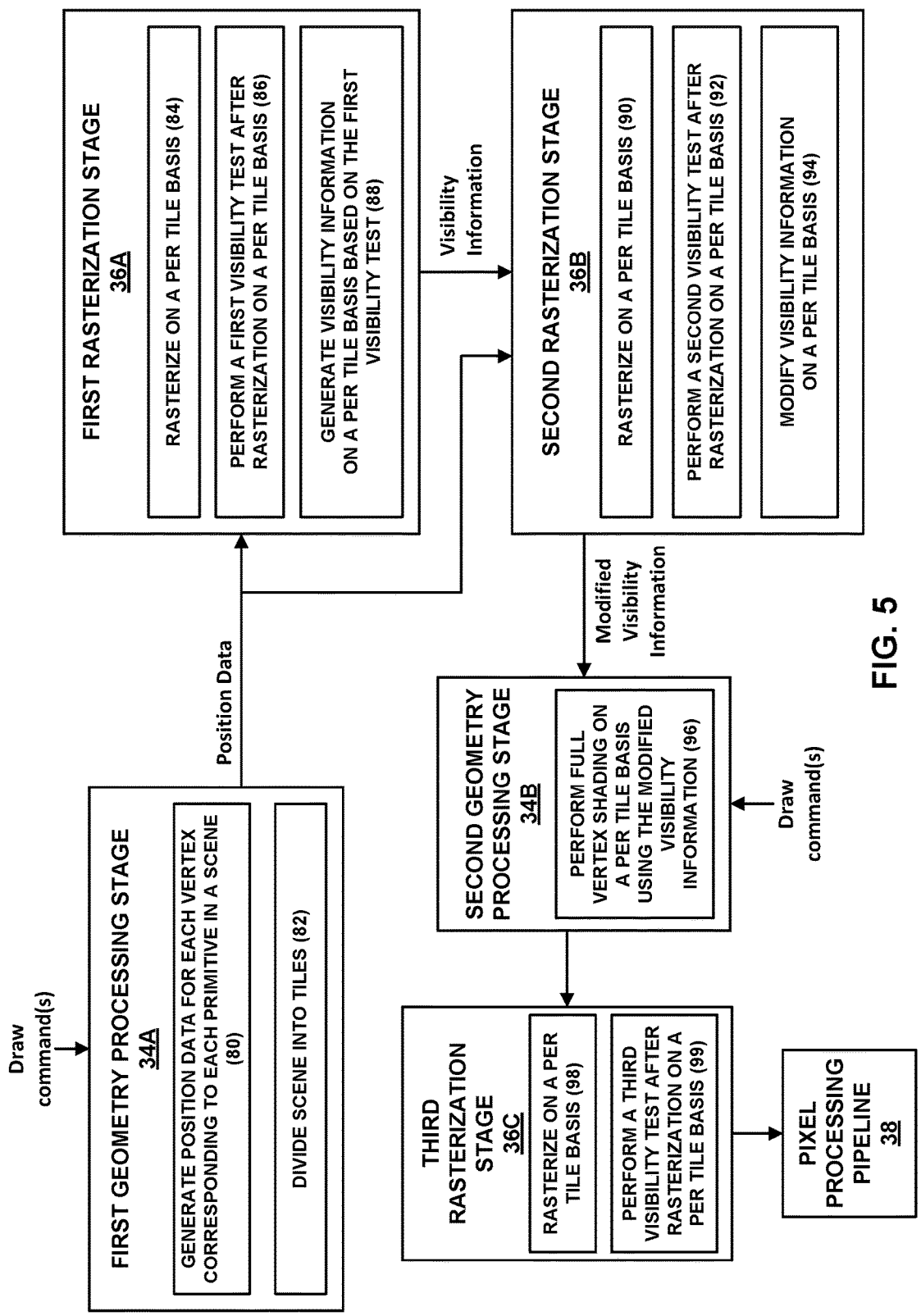
FIG. 5 illustrates one example of processing graphical data in accordance with one or more techniques set forth herein.

FIG. 5 illustrates one example of processing graphical data in accordance with one or more techniques set forth herein.

GPU 12 may be configured to receive and/or generate one or more draw commands. GPU 12 may be configured to process these one or more draw commands in, for example, geometry processing stage 34 of graphics processing pipeline 30. Each draw command may include one or more primitives with each of the one or more primitives having one or more vertices. In the example of shown in FIG. 5, GPU 12 may be configured to process one or more draw commands in, for example, a first geometry processing stage 34A and a second geometry processing stage 34B. Otherwise stated, GPU 12 may be configured to process one or more draw commands in a first pass of geometry processing stage 34 (e.g., first geometry processing stage 34A) and in a second pass of geometry processing stage 34 (e.g., second geometry processing stage 34B).

Referring to first geometry processing stage 34A, GPU 12 may be configured to only generate position data (e.g., coordinate data, such as three-axis (X, Y, Z) coordinate data) for each vertex corresponding to a plurality of primitives (e.g., all the primitives) in a 3-D scene, such as that shown in block 80. For example, GPU 12 may be configured to generate position data once per vertex, and the connectivity information per primitive may be encoded into an input index buffer. The plurality of primitives may be defined by one or more draw commands corresponding to the 3-D scene.

As set forth herein, GPU 12 may be configured to perform tile-based rendering by dividing a 3-D scene in a plurality of tiles, such as that shown in block 82. As used herein, reference to dividing a 3-D scene into a plurality of tiles refers to dividing 2-D space used to represent the three-dimensional scene from a particular view point into a plurality of tiles. In some examples, the 2-D space may be divided into two tiles, three tiles, four tiles, or any number of tiles. In other examples, GPU 12 may be configured to perform one or more techniques set forth herein without using tile-based rendering on the 3-D scene.

GPU 12 may be configured to rasterize tiles on a per-tile basis in a first rasterization stage 36A, such as that shown in block 84. The first rasterization stage 36A may be referred to as a first rasterization pass. During the first rasterization pass, GPU 12 may be configured to rasterize tiles on a per-tile basis using position data generated by the first geometry processing stage 34A. GPU 12 may be configured to rasterize each tile during the first rasterization stage 36A according to a first pixel granularity level, such as 8×8, 8×16, 32×32, tile length×tile width, or any M×N pixel block where M and N are positive integers that may or may not be equal to each other.

GPU 12 may be configured to perform a first visibility test after rasterization on a per-tile basis during the first rasterization stage 36A, such as that shown in block 86. For example, GPU 12 may be configured to perform a first visibility test on a rasterized tile. In some examples, the first visibility test may include or otherwise be based on any z-test. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, GPU 12 may be configured to perform a first visibility test, with the first visibility test using or otherwise being based on a z-test.

In other examples, the first visibility test may not use or otherwise be based on a z-test. For example, the first visibility test may include any other occlusion culling technique that does not constitute a z-test and is performed after rasterization. For example, the first visibility test may include one or more of the following: determining whether any of the plurality of primitives in the will not be visible in the final rendered 2-D scene by determining whether any of the plurality of primitives (1) are backward facing, (2) have zero area, or (3) have zero area in the tile being processed (e.g., the primitive is not present in the particular tile). In such an example, GPU 12 may be configured to perform the first visibility test. In some examples, GPU 12 may be configured to perform the entire first visibility test on a per tile basis. In some examples, one or more techniques described with respect to the first visibility test may take into account the position data generated at block 80 by, for example, a position only vertex shader, which may be done once per scene. The first visibility test may include primitive projection based on the generated position data.

In some examples, the first visibility test may be performed as part of the first rasterization stage 36A, such as that shown in FIG. 5. In other examples, the first visibility test may be performed as part of another graphics pipeline stage before second rasterization stage 36B.

GPU 12 may be configured to generate visibility information on a per tile basis based on the first visibility test, such as that shown in block 88. While the visibility information is generated on a per tile basis, it is understood that this means that each tile has visibility information associated therewith and that the visibility information may be generated for each tile at the same time. For example, GPU 12 may be configured to generate the visibility information for each tile before performing a second rasterization pass on any tile (e.g., before rasterizing any tile a second time). As another example, GPU 12 may be configured to generate the visibility information for each tile before performing full vertex shading for each tile. As another example, GPU 12 may be configured to generate the visibility information for each tile based on a first visibility test but before performing a second visibility test for each tile.

The visibility information generated for each tile may include a value for each primitive in the 3-D scene (e.g., each primitive defined by each draw command associated with the 3-D scene). In such examples, the value for each primitive may include, for example, a binary value or another type of value. For example, the value for each primitive may include one of two values: a first value or a second value. The first value may indicate that a primitive corresponding to the first value will not be visible in the final rendered 2-D scene for the tile with which the visibility information corresponds. The second value may indicate that a primitive corresponding to the second value will possibly be visible in the final rendered 2-D scene for the tile with which the visibility information corresponds. In some examples, a value of "0" may be used to indicate which primitive(s) in the 3-D scene will not be visible in the final rendered scene for each particular tile, and a value of "1" may be used to indicate which primitive(s) in the 3-D scene will possibly be visible in the final rendered scene for each particular tile.

In other examples, GPU 12 may be configured to perform one or more aspects of the first visibility test on the 3-D scene as a whole, and one or more aspects of the first visibility test on a per tile basis. In such examples, GPU 12 may be configured to determine which primitives are backward facing or have zero area for the entire 3-D scene because regardless of which tiles such primitives are associated with, such primitives will not be visible in the final rendered 2-D scene by virtue of being backward facing and/or having zero area. By performing these two determinations on a global level (i.e., for the entire scene instead of on a tile-by-tile basis), GPU 12 is configured to save (e.g., reduce the consumption of) processing resources by avoiding having to make the same determination(s) (e.g., whether a primitive is backward facing and/or has zero area) more than once since such determination(s) are tile-independent. Determinations that are tile-independent are those that apply to all tiles. For example, a backward facing primitive is backward facing for all tiles regardless and can be identified in visibility information as not being visible in the final rendered 2-D image. Further explained using a four tile example, a backward facing primitive may have area in three tiles and zero area in the fourth tile. However, by determining that the primitive is backward facing, GPU 12 has determined that the primitive is not visible regardless of whether the primitive has any area in any tile. Accordingly, GPU 12 may be configured to store such a determination to skip any other test associated with the first visibility test (e.g., has zero in the tile being processed) when later generating visibility information on a tile-by-tile basis.

In some examples, GPU 12 may be configured to encode generated visibility information for each tile using any encoding technique, such as any run-length encoding technique. For example, GPU 12 may be configured to run-length encode visibility information in examples where visibility information is represented as a series (e.g., a string) of 0s and 1s.

In some examples, visibility information may be generated as part of the first rasterization stage 36A, such as that shown in FIG. 5. In other examples, visibility information may be generated as part of another graphics pipeline stage before second rasterization stage 36B.

GPU 12 may be configured to rasterize tiles on a per-tile basis in a second rasterization stage 36B, such as that shown in block 90. The second rasterization stage 36B may be referred to as a second rasterization pass. During the second rasterization pass, GPU 12 may be configured to rasterize tiles on a per-tile basis using position data generated by the first geometry processing stage 34A. By re-using position data previously generated during first geometry processing stage 34A, GPU 12 may be configured to avoid having to perform a second position only vertex shading process.

GPU 12 may be configured to rasterize each tile during the second rasterization stage 36B according to a second pixel granularity level, such as 1×1, 2×2, 4×4, 4×8 8×8, 8×16, 32×32, tile length×tile width, or any M×N pixel block where M and N are positive integers that may or may not be equal to each other. In some examples, the second pixel granularity level of the second rasterization stage 36B may be less than or equal to the first pixel granularity level of the first rasterization stage 36A. As used herein, a lower pixel granularity level means a finer (as opposed to coarser) granularity level. For example, the second pixel granularity level may be 1×1, 2×2, or 4×4 where the first pixel granularity level may be 8×8, 32×32, or 256×246 to list just a few examples. In these examples, 1×1, 2×2, and 4×4 is each an example of a pixel granularity level that is less than the pixel granularity levels of 8×8, 32×32, and 256×256.

As another example, GPU 12 may be configured to rasterize on a per-tile basis in the second rasterization stage 36B using the generated visibility information. In such an example, GPU 12 may be configured to only rasterize the primitives not identified in the visibility information as non-visible, not being visible, that will not be visible, or that will not be rendered, or the like. Otherwise stated, GPU 12 may be configured to only rasterize the primitives identified in the visibility information as possibly visible, that will possibly visible, that will be rendered, or the like. As one example, take for instance an example where visibility information includes a first value indicating that a primitive corresponding to the first value will not be visible in the final rendered 2-D scene for the tile with which the visibility information corresponds, and a second value indicating that a primitive corresponding to the second value will possibly be visible in the final rendered 2-D scene for the tile with which the visibility information corresponds. GPU 12 may be configured to rasterize only primitives that have a corresponding value of the second value.

GPU 12 may be configured to perform a second visibility test after rasterization on a per-tile basis during the second rasterization stage 36B, such as that shown in block 92. For example, GPU 12 may be configured to perform a second visibility test on a rasterized tile generated during the second rasterization stage 36B. In some examples, the second visibility test may include or otherwise be based on any z-test. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, GPU 12 may be configured to perform a second visibility test, with the second visibility test using or otherwise being based on a z-test.

In some examples, the first visibility test may be a z-test with an M×N pixel granularity level that is greater than the M×N pixel granularity of the second visibility test. For example, the first visibility test may be a low resolution z-test and the second visibility test may be a fine resolution z test. In other examples, the first visibility test and the second visibility test may be the same where the second pixel granularity level of the second rasterization stage 36B is less than the first pixel granularity level of the first rasterization stage 36A. In other examples, the first visibility test and the second visibility test may be different where the second pixel granularity level of the second rasterization stage 36B is equal to the first pixel granularity level of the first rasterization stage 36A.

GPU 12 may be configured to modify visibility information on a per tile basis, such as that shown in block 94. In examples where GPU 12 is configured to encode generated visibility information for each tile, GPU 12 may be configured to decode any encoded visibility information. For example, GPU 12 may be configured to perform a decoding process that is the reciprocal of the encoding process. As set forth herein, GPU 12 may be configured to modify visibility information, whether or not in encoded form. Generally, however, GPU 12 is configured to modify uncompressed visibility information. Uncompressed visibility information may constitute decoded visibility information or visibility information that was never encoded.

In some examples, visibility information may be modified as part of the second rasterization stage 36B, such as that shown in FIG. 5. In other examples, visibility information may be modified as part of another graphics pipeline stage before performing full vertex shading on a per tile basis.

As used herein, modifying visibility information may similarly refer to changing, adjusting, altering, or revising the visibility information. Modifying visibility information does not include encoding or decoding visibility information. While encoding or decoding visibility information does in fact transform the visibility information into an encoded or decoded state, respectively, this is not the type of modification contemplated. In some examples, GPU 12 may be configured to modify visibility information on a per tile basis based on the second visibility test that is performed on a per tile basis.

As set forth above, visibility information generated for each tile may include a value for each primitive in the 3-D scene (e.g., each primitive defined by each draw command associated with the 3-D scene). In such examples, GPU 12 may be configured to modify visibility information by modifying at least one value of the visibility information (e.g., by modifying a first value to a second value and/or modifying a second value to a first value). For example, based on the results of the second visibility test for a first tile, GPU 12 may be configured to modify one or more values of the visibility information generated for the first tile.

As described above, in some examples, a value of "0" may be used to indicate which primitive(s) in the 3-D scene will not be visible in the final rendered scene for each particular tile, and a value of "1" may be used to indicate which primitive(s) in the 3-D scene will possibly be visible in the final rendered scene for each particular tile. In such examples, GPU 12 may be configured to modify visibility information by modifying at least one value of the visibility information from a value of "1" to a value of "0" and/or modifying at least one value of the visibility information from a value of "0" to a value of "1." Such modification may be based on the second visibility test (e.g., any result(s) from the second visibility test).

In some examples, following modification of visibility information for a tile, the modified visibility information for that tile may indicate which primitives(s) in the 3-D scene will not be visible in the final rendered 2-D scene, and may also indicate which primitive(s) in the 3-D scene will be visible in the final rendered 2-D scene. For example, by performing the second visibility test after rasterization, GPU 12 may be configured to determine (and identify via the modified visibility information) which primitives will actually be visible in the final rendered 2-D scene instead of determining which primitives will possibly be visible in the final rendered 2-D scene. In examples where the visibility information generated for each tile includes a value for each primitive in the 3-D scene (e.g., each primitive defined by each draw command associated with the 3-D scene), then so too does any modified visibility information.

In such examples, the value for each primitive in modified visibility information may have a different attributed meaning. For example, the value for each primitive may include one of two values in the modified visibility information: a first value or a second value. The first value may indicate that a primitive corresponding to the first value will not be visible in the final rendered 2-D scene for the tile with which the modified visibility information corresponds. The second value may indicate that a primitive corresponding to the second value will be visible in the final rendered 2-D scene for the tile with which the modified visibility information corresponds instead of indicating that a primitive corresponding to the second value will possibly be visible in the final rendered 2-D scene. For example, a value of "0" may mean the same thing in visibility information and modified visibility information, whereas a value of "1" may have different meanings in visibility information and modified visibility information. However, it is understood that the value of "1" (or any other second value) carries the same meaning in that it controls which primitives are rendered for a particular tile during, for example, the rendering pass (e.g., second rasterization stage 36B discussed below). In this regard, it is understood that visibility information may be described as including information that indicates which primitives will not be rendered (e.g., primitives described herein as not being visible and/or that will not be visible in the final rendered 2-D scene) on a per tile basis. Similarly, it is understood that visibility information may be described as including information that indicates which primitives will be rendered (e.g., primitives described herein as being visible or possibly visible, and/or or that will be visible or will possibly be visible in the final rendered 2-D scene) on a per tile basis.

It is understood that the second visibility test performed after rasterization may or may not include error. For example, a low resolution z-test includes more error than a high resolution z-test, but the low resolution z-test is more cost effective from a resource consumption standpoint. Accordingly, as set forth herein, reference to a primitive as being visible (e.g., will be visible) in the final rendered 2-D scene may, within the realm of error associated with the second visibility test performed, refer to a primitive that will not actually be visible in the final rendered 2-D scene. For example, in an example where the second visibility test is a low resolution z-test and the third visibility test performed during a third rasterization stage (discussed in more detail below) is a high resolution z-test, this may result in a few primitives having to be rendered that do not actually contribute to the final rendered 2-D scene. However, it is understood that even considering this error, GPU 12 is configured to reduce or eliminate primitives identified as possibly visible in visibility information that are actually not visible. Accordingly, as set forth herein, reference to a primitive as being visible (e.g., will be visible) in the final rendered 2-D scene may, due to any error associated with the second visibility test performed, refer to a primitive that will be possibly be visible in the final rendered 2-D scene. In this example, primitives identified as being possibly visible in modified visibility information are more likely to be visible in the final rendered 2-D scene compared to primitives identified as being possibly visible in visibility information.

In some examples, first geometry processing stage 34A, first rasterization stage 36A, and second rasterization stage 36B may be referred to as the binning pass (or tiling pass). As described above, GPU 12 may be configured to sort a scene into a plurality of tiles for processing on a per tile basis (e.g., a tile-by-tile basis) in the binning pass. All draw commands for the 3-D scene may be processed during the binning pass. In some examples, first geometry processing stage 34A, first rasterization stage 36A, and second rasterization stage 36B may be referred to as the binning pass (or tiling pass) since full vertex shading may not performed on any tile during these stages. Rather, first geometry processing stage 34A, first rasterization stage 36A, and second rasterization stage 36B prepare each tile for rendering in the rendering pass. In some examples, the rendering pass may be considered to start at second geometry processing stage 34B since full vertex shading may be performed on a per tile basis during this stage.

Referring to second geometry processing stage 34B, GPU 12 may be configured to perform full vertex shading on a per tile basis using the modified visibility information for each tile (to the extent that performing the second visibility test resulted in modification of visibility information), such as that shown in block 96. For example, it is understood that GPU 12 may be configured to modify but need not actually modify visibility information based on the second visibility test. As a 3-D scene becomes more complex, the likelihood of not modifying visibility information based on the second visibility test may reduce. Similarly, the likelihood of not modifying visibility information based on the second visibility test may increase as a 3-D scene becomes more simplistic. As an example, GPU 12 may, depending on the second visibility test performed for each tile, be configured to modify, during the binning pass, visibility information for one or more tiles; and may be configured to not modify, during the binning pass, visibility information for one or more tiles.

Referring back to second geometry processing stage 34B, GPU 12 may be configured to generate position data (e.g., coordinate data, such as three-axis (X, Y, Z) coordinate data) as well as other data for full vertex shading (e.g., color data) for each vertex corresponding to each primitive on a per-tile basis based on modified (or in some examples, unmodified) visibility information. The plurality of primitives (e.g., all the primitives) may be defined by one or more draw commands corresponding to the 3-D scene.

As an example, GPU 12 may be configured to draw vertices in screen space based on, for example, modified visibility information on a per tile basis. In such an example, GPU 12 may be configured to only draw vertices in screen space that are associated with primitives not identified in the modified visibility information as non-visible, not being visible, that will not be visible, or that will not be rendered, or the like. Otherwise stated, GPU 12 may be configured to draw vertices in screen space that are associated with primitives identified in the modified visibility information as visible, that will be visible, that will be rendered, or the like. As one example, take for instance an example where modified visibility information includes a first value indicating that a primitive corresponding to the first value will not be visible in the final rendered 2-D scene for the tile with which the visibility information corresponds, and a second value indicating that a primitive corresponding to the second value will be visible in the final rendered 2-D scene for the tile with which the visibility information corresponds. GPU 12 may be configured to only draw vertices in screen space that are associated with primitives that have a corresponding value of the second value.

Following second geometry processing stage 34B, GPU 12 may be configured to rasterize tiles on a per-tile basis in a third rasterization stage 36C, such as that shown in block 98. Accordingly, GPU 12 may be configured to rasterize tiles three times: a first time during the first rasterization stage 36A, a second time during the second rasterization stage 36B, and a third time during the third rasterization stage 36C. The first rasterization of each tile may be performed so that the first visibility test may be performed. The second rasterization of each tile may be performed so that the second visibility test may be performed. The third rasterization of each tile may be performed to provide pixel information to pixel processing pipeline 38. In some examples, GPU 12 may be configured to perform a third visibility test. The third visibility test may be performed on each rasterized tile generated during the third rasterization stage 36C, such as that shown in block 99.

The third visibility test may or may not be the same as the second visibility test. In examples where the third and second visibility tests are the same, GPU 12 may be configured to re-use any information generated from the second visibility test. For example, where the second and third visibility test are both a z-test of the same type (e.g., both tests are a low resolution z-test, a high resolution z-test, etc), GPU 12 may be configured to re-use any resultant information from GPU 12 performing the second visibility test for the third visibility test. In some examples, if the test is the same, GPU 12 may be configured to not perform the third visibility test, and instead just re-use information generated from the second visibility test. By re-using previously calculated test information, GPU 12 may be configured to reduce the consumption of processing resources in this manner.

In some examples, the third visibility test may include or otherwise be based on any z-test. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, GPU 12 may be configured to perform a third visibility test, with the third visibility test using or otherwise being based on a z-test. In other examples, the third visibility test may not use or otherwise be based on a z-test. For example, the third visibility test may include any other occlusion culling technique that does not constitute a z-test and is performed after rasterization.

Following the third rasterization stage 36C, GPU 12 may be configured to perform pixel processing in pixel processing pipeline 38.

FIG. 5 describes GPU 12 as modifying visibility information as part of the second rasterization stage 36B. However, it is understood that this is one example, and that GPU 12 may be configured to modify visibility information as part of another stage before the second geometry processing stage 34B (e.g., before full vertex shading occurs) or as part of a new stage in the graphics pipeline. For example, GPU 12 may be configured to modify visibility information in what may be termed a visibility information modification stage. The visibility information modification stage may be positioned at any stage between the second rasterization pass (e.g., second rasterization stage 36B) of a tile in the binning pass and a second geometry processing stage (e.g., second geometry processing stage 34B).

It is also understood that GPU 12 may be configured to process a different tile at each of the various stages. For example, GPU 12 may be configured to process a tile in the binning pass while the GPU is processing a different tile in the rendering pass. By processing more than one tile in parallel at various stages in the graphics pipeline, GPU 12 is configured to optimize rendering.

Figures 6A, 6B, 6C:
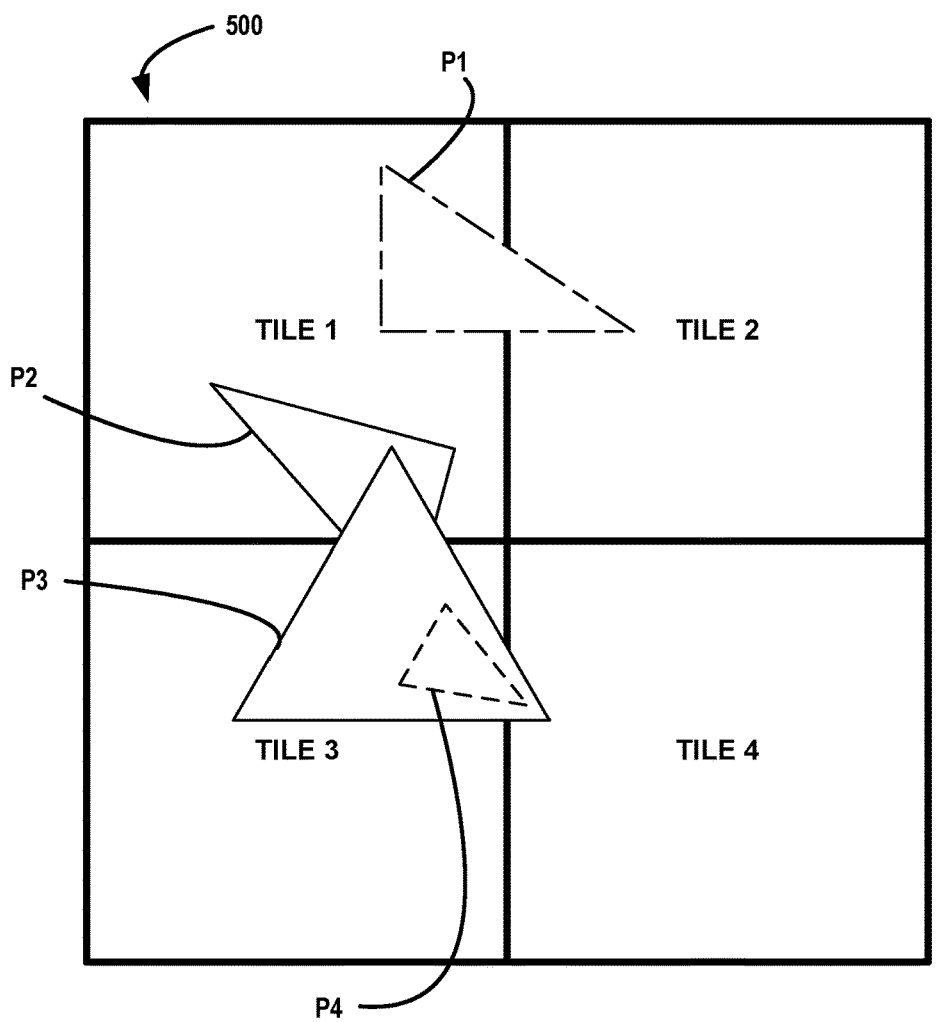
FIG. 6A illustrates one example of a simplified 3-D graphical scene.
FIG. 6B illustrates examples of visibility information.
FIG. 6C illustrates examples of unmodified visibility information and modified visibility information.

FIG. 6A illustrates one example of a simplified 3-D graphical scene 500 comprising a plurality of primitives (e.g., triangles). In the example shown, the plurality of primitives includes four primitives: primitive P1, primitive P2, primitive P3, and primitive P4. In this example, primitive P1 is backward facing, and primitives P2, P3, and P4 are forward facing. Primitive P3 is shown as partially occluding primitive P2 and completely occluding primitive P4.

GPU 12 may process graphical scene 500 into a frame for presentment by a display according to one or more techniques set forth herein. For example, GPU 12 may be configured to, as shown, divide graphical scene 500 into a plurality of tiles (TILE 1, TILE 2, TILE 3, and TILE 4). GPU 12 may be configured to generate visibility information for each of TILES 1-4 according to one or more techniques set forth herein. FIG. 6B illustrates an example of visibility information that may be generated for each of TILES 1-4. Similarly, GPU 12 may be configured to modify visibility information according to one or more techniques set forth herein. FIG. 6C illustrates examples of unmodified and modified visibility information that may be generated according to one or more techniques set forth herein. For example, as shown in FIG. 6C, the visibility information for TILES 1 and 2 were not modified, and the visibility information for TILES 3 and 4 was modified. For example, with respect to TILES 1 and 2, performing the second visibility test on rasterized TILE 1 and rasterized TILE 2 did not result in GPU 12 modifying the visibility information respectively generated for TILES 1 and 2. However, with respect to TILES 3 and 4, performing the second visibility test on rasterized TILE 3 and rasterized TILE 4 did result in GPU 12 modifying the visibility information respectively generated for TILES 3 and 4.

Figure 7:
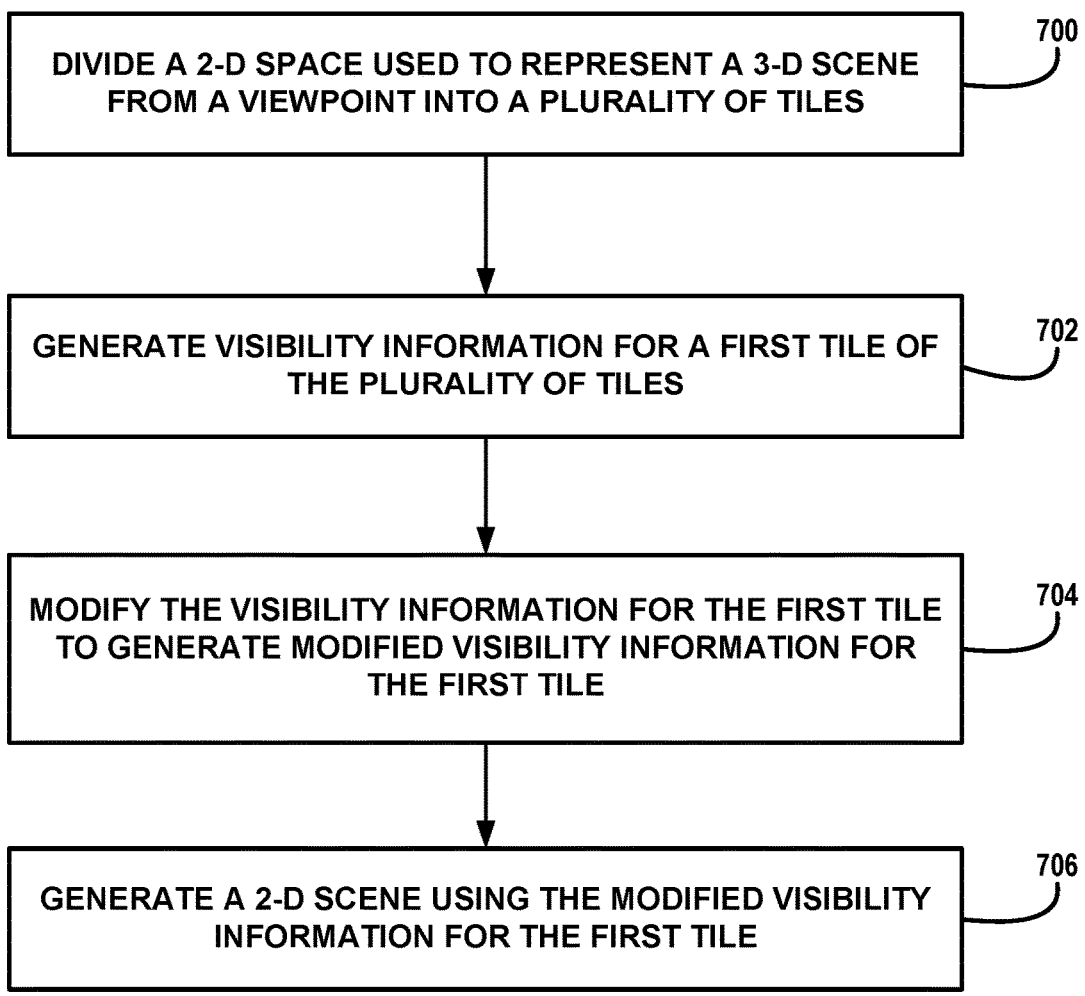
FIG. 7 is a flowchart showing an example method of the disclosure.

FIG. 7 is a flowchart showing an example method of the disclosure. The method of FIG. 7 may be carried out by one or more processing units 1 (e.g., one or more CPUs, one or more GPUs, one or more display processing units, one or more other processing units, or any combinations thereof). FIG. 7 depicts one example method consistent with one or more techniques of this disclosure.

Processing unit 1 may be configured to divide a 2-D space used to represent a 3-D scene from a viewpoint into a plurality of tiles (700). The 3-D scene may include a plurality of primitives. Processing unit 1 may be configured to generate visibility information for each tile of the plurality of tiles on a tile-by-tile basis (e.g., per tile basis). For example, processing unit 1 may be configured to generate visibility information for a first tile of the plurality of tiles (702). Similarly processing unit 1 may be configured to generate visibility information for a second tile of the plurality of tiles, a third tile of the plurality of tiles, a fourth tile of the plurality of tiles, etc. In some examples, the visibility information generated for each tile may include a value for each primitive of the plurality of primitives (e.g., all of the primitives in the 3-D scene or less than all of the primitives in the 3-D scene depending on the example). For example, the visibility information for the first tile includes a value for each primitive of the plurality of primitives. The value for each primitive may either be a first value or a second value according to some examples. In such examples, the first value may indicate a primitive with which the first value is associated is not to be rendered or the like as described herein.

Processing unit 1 may be configured to modify the visibility information for the first tile to generate modified visibility information for the first tile (704). Similarly processing unit 1 may be configured to modify visibility information for a second tile of the plurality of tiles, a third tile of the plurality of tiles, a fourth tile of the plurality of tiles, etc. For example, processing unit 1 may be configured to modify visibility information on a tile-by-tile basis.

In some examples, processing unit 1 may be configured to modify visibility information by being configured to modify at least one value of visibility information for at least one tile of the plurality of tiles. For example, processing unit 1 may be configured to modify the visibility information for the first tile by being configured to modify at least one value of the visibility information for the first tile. As another example, processing unit 1 may be configured to modify the visibility information for the first tile by being configured to modify at least one second value respectively corresponding to at least one primitive of the visibility information for the first tile to the first value. In another example, processing unit 1 may be configured to modify the visibility information for the first tile by being configured to modify at least one first value respectively corresponding to at least one primitive of the visibility information for the first tile to the second value.

Processing unit 1 may be configured to generate a 2-D scene using modified visibility information. For example, processing unit 1 may be configured to generate a 2-D scene using the modified visibility information for the first tile (706). In some examples, processing unit 1 may be configured to generate a 2-D scene using modified visibility information by full vertex shading based on modified visibility information. For example, processing unit 1 may be configured to generate the 2-D scene using the modified visibility information for the first tile by being configured to full vertex shade the first tile using the modified visibility information.

In some examples, processing unit 1 may be configured to modify visibility information by being configured to modify visibility information based on a visibility test. For example, processing unit 1 may be configured to modify the visibility information for the first tile by being configured to modify the visibility information for the first tile based on a visibility test. In such examples, the visibility test may include a z-test (e.g., any z-test) or any other occlusion culling technique that does not constitute a z-test and is performed after rasterization. Exemplary z-tests include any pixel level z-test (e.g., a high resolution z-test), any block level z-test (e.g., a low resolution z-test), and any hybrid thereof. In some examples, the block level z-test may be based on a 2×2 pixel block, 3×3 pixel block, 4×4 pixel block, or any M×N pixel block, where M and N are positive integers that may or may not be equal to each other. Otherwise described, processing unit 1 may be configured to perform a second visibility test, with the second visibility test using or otherwise being based on a z-test. In other examples, the second visibility test may not use or otherwise be based on a z-test. For example, the second visibility test may include any other occlusion culling technique that does not constitute a z-test and is performed after rasterization.

In some examples, processing unit 1 may be configured to rasterize, during a first rasterization pass, the first tile to generate a rasterized first tile a first time. In such examples, processing unit 1 may be configured to perform a first visibility test using the rasterized first tile generated during the first rasterization pass. Processing unit 1 may be configured to generate the visibility information for the first tile based on the first visibility test.

In some examples, processing unit 1 may be configured to rasterize, during a second rasterization pass, the first tile to generate a rasterized first tile a second time. In such examples, processing unit 1 may be configured to perform a second visibility test using the rasterized first tile generated during the second rasterization pass. Processing unit 1 may be configured to modify the visibility information for the first tile based on the second visibility test.

In some examples, processing unit 1 may be configured to rasterize the first tile during the first rasterization pass according to a first rasterization pixel granularity level. In such examples, processing unit 1 may be configured to rasterize the first tile during the second rasterization pass according to a second rasterization pixel granularity level. In some examples, the second rasterization pixel granularity level may be less than or equal to the first rasterization pixel granularity level. As a few examples, the second rasterization pixel granularity level may be 1×1, 2×2, or 4×4 and the first rasterization pixel granularity level may be 8×8, 32×32, or tile length×tile width.

In some examples, the first visibility test includes a first z-test having a first pixel granularity level and the second visibility test includes a second z-test having a second pixel granularity level. In such examples, the second pixel granularity level may be less than or equal to the first pixel granularity level. As a few examples, the second pixel granularity level for the second z-test may be 1×1, 2×2, or 4×4 and the first pixel granularity level for the first z-test may be 8×8, 8×16, or 32×32. As another example, the first visibility test may include a low resolution z-test and the second visibility test may include a high resolution z-test.

In some examples, processing unit 1 may be configured to rasterize each tile of the plurality of tiles on a tile-by-tile basis to generate a rasterized tile of each tile. For example, processing unit 1 may be configured to rasterize the first tile to generate a rasterized first tile. Similarly, processing unit 1 may be configured to rasterize the second tile to generate a rasterized second tile. Processing unit 1 may be configured to perform the visibility test on each rasterized tile on a per tile basis. For example, processing unit 1 may be configured to perform the first visibility test using the rasterized first tile. Similarly, processing unit 1 may be configured to perform the first visibility test using the rasterized second tile. As set forth herein, processing unit 1 may be configured to modify visibility information based on a visibility test (e.g., the second visibility test described with respect to some examples).

In some examples, processing unit 1 may be configured to modify visibility information before performing a second rasterization of any tile for which visibility information is being generated. For example, processing unit 1 may be configured to modify visibility information for the first tile before rasterizing the first tile a second time. Similarly, processing unit 1 may be configured to modify visibility information for the second tile before rasterizing the second tile a second time.

In other examples, processing unit 1 may be configured to modify visibility information before performing a third rasterization of any tile for which visibility information is being generated. For example, processing unit 1 may be configured to modify visibility information for the first tile before rasterizing the first tile a third time. Similarly, processing unit 1 may be configured to modify visibility information for the second tile before rasterizing the second tile a third time. As another example, processing unit 1 may be configured to rasterize the first tile a first time and a second time before modifying the visibility information for the first tile. Processing unit 1 may be configured to rasterize the first tile a third time after modifying the visibility information for the first tile.

In some examples, processing unit 1 may be configured to modify visibility information before performing full vertex shading. For example, processing unit 1 may be configured to modify visibility information for the first tile before performing full vertex shading for the first tile. Similarly, processing unit 1 may be configured to modify visibility information for the second tile before performing full vertex shading for the second tile.

FIG. 7 is generally described with respect to a first tile of a plurality of tiles. However, it is understood that the various examples of processes described with respect to FIG. 7 may apply to one or more (e.g., all) tiles corresponding to the plurality of tiles. For example, processing unit 1 may be configured generate visibility information for each of the plurality of tiles. Processing unit 1 may be configured to modify the visibility information corresponding to at least one of the plurality of tiles to generate modified visibility information for the at least one of the plurality of tiles. Processing unit 1 may be configured to generate the 2-D scene using the modified visibility information generated for the at least one of the plurality of tiles.

It should be understood that all of the techniques described herein may be used individually or in combination. For example, processing unit 1 and/or one or more components thereof may perform the techniques described in this disclosure in any combination. As another example, GPU 12 and/or one or more components thereof may perform the techniques described in this disclosure in any combination.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for graphics processing. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for rendering a 3-D scene of graphical data into a 2-D scene, the method comprising:

dividing a 2-D space used to represent the 3-D scene from a viewpoint into a plurality of tiles, wherein the 3-D scene includes a plurality of primitives;

rasterizing, during a first rasterization pass, only position data of a first tile of the plurality of tiles according to a first rasterization pixel granularity level to generate a first rasterized first tile;

performing a first visibility test using the first rasterized first tile generated by the first rasterization pass;

generating visibility information for the first tile of the plurality of tiles based on the first visibility test, wherein the visibility information for the first tile includes a value for each primitive of the plurality of primitives, wherein the value for each primitive is either a first value or a second value, and wherein the first value indicates a primitive with which the first value is associated is not to be rendered, and the second value indicates a primitive with which the second value is associated is to be rendered;

rasterizing, during a second rasterization pass, only position data of primitives of the first tile identified as being visible by the visibility information according to a second rasterization pixel granularity level to generate a second rasterized first tile, wherein the second rasterization pixel granularity level is less than or equal to the first rasterization pixel granularity level;

generating second visibility information for a second tile of the plurality of tiles while rasterizing the first tile according to the second rasterization pixel granularity level;

performing a second visibility test using the second rasterized first tile generated by the second rasterization pass;

modifying the visibility information for the first tile to generate modified visibility information for the first tile based on the second visibility test; and rendering position data and color data of primitives of the first tile identified as being visible by the modified visibility information for the first tile.

2. The method of claim 1, wherein modifying the visibility information comprises modifying at least one second value respectively corresponding to at least one primitive of the visibility information for the first tile to the first value.

3. The method of claim 1, wherein the first visibility test includes a first z-test having a first pixel granularity level and the second visibility test includes a second z-test having a second pixel granularity level, and wherein the second pixel granularity level is less than or equal to the first pixel granularity level.

4. The method of claim 3, wherein the first visibility test includes a low resolution z-test and the second visibility test includes a high resolution z-test.

5. The method of claim 1, further comprising:
modifying the visibility information for the first tile before performing full vertex shading for the first tile.

6. The method of claim 1, further comprising:
rasterizing the first tile after modifying the visibility information for the first tile.

7. A device comprising:
a memory for storing rendered graphical data; and
one or more processors configured to:
divide a 2-D space used to represent a 3-D scene from a viewpoint into a plurality of tiles, wherein the 3-D scene includes a plurality of primitives;
rasterize, during a first rasterization pass, only position data of a first tile of the plurality of tiles according to a first rasterization pixel granularity level to generate a first rasterized first tile;
perform a first visibility test using the first rasterized first tile generated by the first rasterization pass;
generate visibility information for the first tile of the plurality of tiles based on the first visibility test, wherein the visibility information for the first tile includes a value for each primitive of the plurality of primitives, wherein the value for each primitive is either a first value or a second value, and wherein the first value indicates a primitive with which the first value is associated is not to be rendered, and the second value indicates a primitive with which the second value is associated is to be rendered;
rasterize, during a second rasterization pass, only position data of primitives of the first tile identified as being visible by the visibility information according to a second rasterization pixel granularity level to generate a second rasterized first tile, wherein the second rasterization pixel granularity level is less than or equal to the first rasterization pixel granularity level;
generate second visibility information for a second tile of the plurality of tiles while rasterizing the first tile according to the second rasterization pixel granularity level;
perform a second visibility test using the second rasterized first tile generated by the second rasterization pass;
modify the visibility information for the first tile to generate modified visibility information for the first tile based on the second visibility test;
render position data and color data of primitives of the first tile identified as being visible by the modified visibility information for the first tile; and
store the 2-D scene in the memory.

8. The device of claim 7, wherein the one or more processors being configured to modify the visibility information comprises the one or more processors being configured to modify at least one second value respectively corresponding to at least one primitive of the visibility information for the first tile to the first value.

9. The device of claim 7, wherein the first visibility test includes a low resolution z-test and the second visibility test includes a high resolution z-test.

10. The device of claim 7, wherein the one or more processors are configured to:
modify the visibility information for the first tile before performing full vertex shading for the first tile.

11. An apparatus comprising:
means for dividing a 2-D space used to represent a 3-D scene from a viewpoint into a plurality of tiles, wherein the 3-D scene includes a plurality of primitives;
means for rasterizing, during a first rasterization pass, only position data of a first tile of the plurality of tiles according to a first rasterization pixel granularity level to generate a first rasterized first tile;
means for performing a first visibility test using the first rasterized first tile generated by the first rasterization pass;
means for generating visibility information for the first tile of the plurality of tiles based on the first visibility test, wherein the visibility information for the first tile includes a value for each primitive of the plurality of primitives, wherein the value for each primitive is either a first value or a second value, and wherein the first value indicates a primitive with which the first value is associated is not to be rendered, and the second value indicates a primitive with which the second value is associated is to be rendered;
means for rasterizing, during a second rasterization pass, only position data of primitives of the first tile identified as being visible by the visibility information according to a second rasterization pixel granularity level to generate a second rasterized first tile, wherein the second rasterization pixel granularity level is less than or equal to the first rasterization pixel granularity level;
means for generating second visibility information for a second tile of the plurality of tiles while rasterizing the first tile according to the second rasterization pixel granularity level;
means for performing a second visibility test using the second rasterized first tile generated by the second rasterization pass;
means for modifying the visibility information for the first tile to generate modified visibility information for the first tile based on the second visibility test; and
means for rendering position data and color data of primitives of the first tile identified as being visible by the modified visibility information for the first tile.

12. The apparatus of claim 11, wherein means for modifying the visibility information comprises means for modifying at least one second value respectively corresponding to at least one primitive of the visibility information for the first tile to the first value.

13. The apparatus of claim 11, wherein the first visibility test includes a low resolution z-test and the second visibility test includes a high resolution z-test.

14. The apparatus of claim 11, further comprising:
means for modifying the visibility information for the first tile before performing full vertex shading for the first tile.

15. A non-transitory computer-readable storage medium having instructions stored thereon that, when executed, cause one or more processors to:
divide a 2-D space used to represent a 3-D scene from a viewpoint into a plurality of tiles, wherein the 3-D scene includes a plurality of primitives;
rasterize, during a first rasterization pass, only position data of a first tile of the plurality of tiles according to a first rasterization pixel granularity level to generate a first rasterized first tile;
perform a first visibility test using the first rasterized first tile generated by the first rasterization pass;
generate visibility information for the first tile of the plurality of tiles based on the first visibility test, wherein the visibility information for the first tile includes a value for each primitive of the plurality of primitives, wherein the value for each primitive is either a first value or a second value, and wherein the first value indicates a primitive with which the first value is associated is not to be rendered, and the second value indicates a primitive with which the second value is associated is to be rendered;
rasterize, during a second rasterization pass, only position data of primitives of the first tile identified as being visible by the visibility information according to a second rasterization pixel granularity level to generate a second rasterized first tile, wherein the second rasterization pixel granularity level is less than or equal to the first rasterization pixel granularity level;
generate second visibility information for a second tile of the plurality of tiles while rasterizing the first tile according to the second rasterization pixel granularity level;
perform a second visibility test using the second rasterized first tile generated by the second rasterization pass;
modify the visibility information for the first tile to generate modified visibility information for the first tile based on the second visibility test; and
render position data and color data of primitives of the first tile identified as being visible by the modified visibility information for the first tile.

16. The non-transitory computer-readable storage medium of claim 15, wherein the instructions stored thereon that, when executed, cause the one or more processors to modify the visibility information comprise instructions that, when executed, cause the one or more processors to modify at least one second value respectively corresponding to at least one primitive of the visibility information for the first tile to the first value.

17. The non-transitory computer-readable storage medium of claim 15, wherein the first visibility test includes a low resolution z-test and the second visibility test includes a high resolution z-test.

18. The non-transitory computer-readable storage medium of claim 15, further comprising instructions stored thereon that, when executed, cause the one or more processors to:
modify the visibility information for the first tile before performing full vertex shading for the first tile.

* * * * *